(12) United States Patent
Veprinsky et al.

(10) Patent No.: US 7,822,939 B1
(45) Date of Patent: Oct. 26, 2010

(54) DATA DE-DUPLICATION USING THIN PROVISIONING

(75) Inventors: Alexandr Veprinsky, Brookline, MA (US); Ofer E. Michael, Newton, MA (US); Michael J. Scharland, Franklin, MA (US)

(73) Assignee: EMC Corporation, Hopkinton, MA (US)

( * ) Notice: Subject to any disclaimer, the term of this patent is extended or adjusted under 35 U.S.C. 154(b) by 495 days.

(21) Appl. No.: 11/903,869

(22) Filed: Sep. 25, 2007

(51) Int. Cl.
*G06F 12/00* (2006.01)

(52) U.S. Cl. .................. 711/170; 711/161; 711/162; 711/E12.002

(58) Field of Classification Search ............ None
See application file for complete search history.

(56) References Cited

U.S. PATENT DOCUMENTS

| | | | |
|---|---|---|---|
| 5,206,939 A | 4/1993 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 6,704,730 B2 | 3/2004 | Moulton et al. | |
| 6,826,711 B2 | 11/2004 | Moulton et al. | |
| 7,062,648 B2 | 6/2006 | Moulton et al. | |
| 7,194,504 B2 | 3/2007 | Moulton | |
| 7,340,461 B2 | 3/2008 | Vishlitzky et al. | |
| 2001/0034795 A1 | 10/2001 | Moulton et al. | |
| 2007/0208788 A1* | 9/2007 | Chakravarty et al. | 707/204 |
| 2007/0226444 A1* | 9/2007 | Yagawa | 711/170 |
| 2008/0005141 A1* | 1/2008 | Zheng et al. | 707/101 |

OTHER PUBLICATIONS

U.S. Appl. No. 11/823,156, filed Jun. 27, 2007, Burke et al.
U.S. Appl. No. 11/726,831, filed Mar. 23, 2007, Yochai.

* cited by examiner

*Primary Examiner*—Shawn X Gu
(74) *Attorney, Agent, or Firm*—Muirhead and Saturnelli, LLC

(57) ABSTRACT

A system for de-duplicating data includes providing a first volume including at least one pointer to a second volume that corresponds to physical storage space, wherein the first volume is a logical volume. A first set of data is detected as a duplicate of a second set of data stored on the second volume at a first data chunk. A pointer of the first volume associated with the first set of data is modified to point to the first data chunk. After modifying the pointer, no additional physical storage space is allocated for the first set of data.

25 Claims, 31 Drawing Sheets

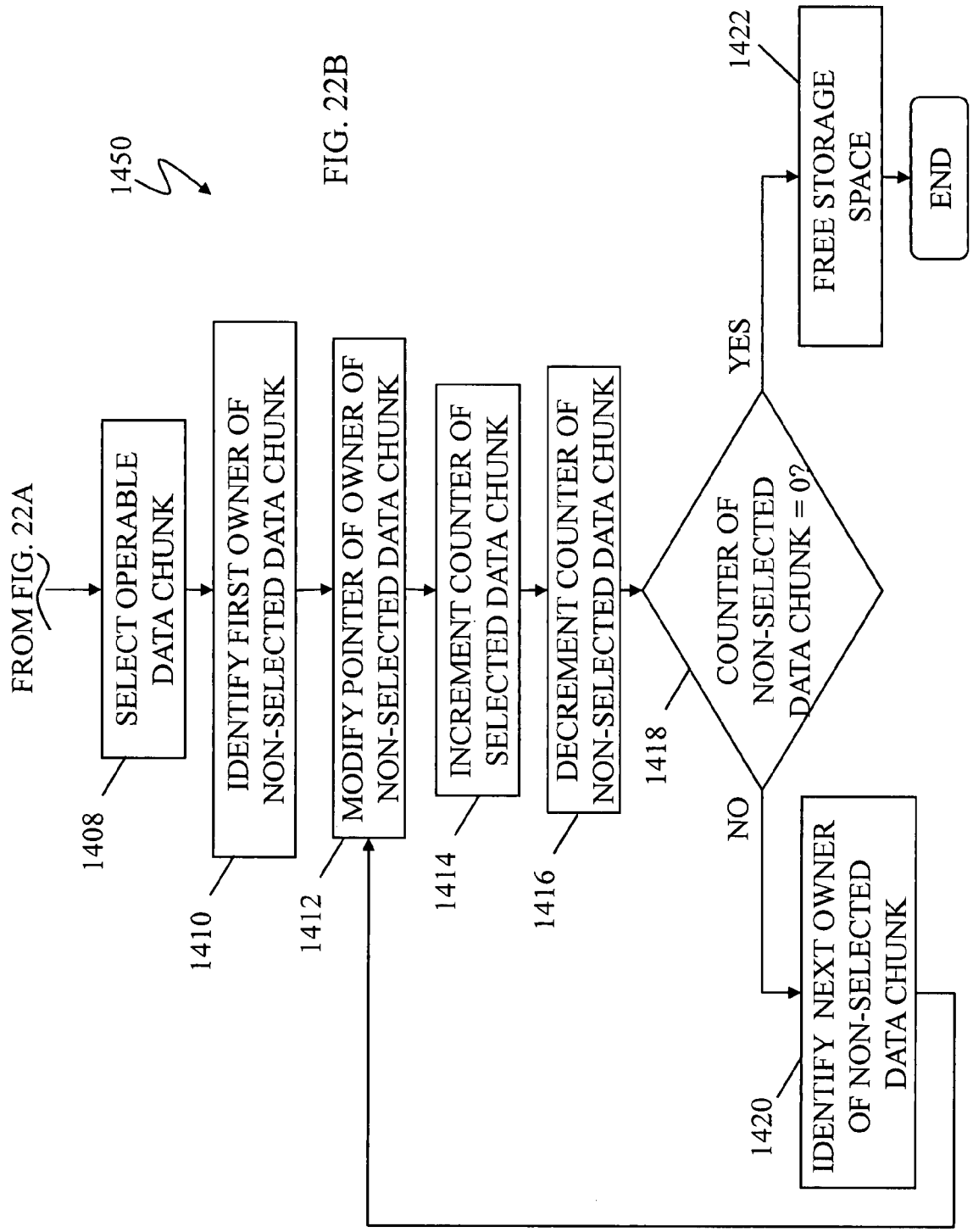

DATA DE-DUPLICATION USING THIN PROVISIONING

TECHNICAL FIELD

This application relates to computer storage devices and, more particularly, to the field of managing data stored on a computer storage device.

BACKGROUND OF THE INVENTION

Host processor systems may store and retrieve data using storage devices containing a plurality of host interface units (host adapters), disk drives, and disk interface units (disk adapters). Such storage devices are provided, for example, by EMC Corporation of Hopkinton, Mass. and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek, which are incorporated herein by reference. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. Different sections of the logical volumes may or may not correspond to the actual disk drives.

Information Lifecycle Management (ILM) concerns the management of data throughout the data's lifecycle. The value of data may change over time and, accordingly, the needs for the storage and accessibility of the data may change during the lifecycle of the data. For example, data that is initially accessed often may, over time, become less valuable and the need to access that data become more infrequent. It may not be efficient for such data infrequently accessed to be stored on a fast and expensive storage device. On the other hand, older data may suddenly become more valuable and, where once accessed infrequently, become more frequently accessed. In this case, it may not be efficient for such data to be stored on a slower storage system when data access frequency increases. Further, during data's lifecycle there may be instances when multiple copies of data exist at a particular point of time on a storage system and unnecessarily take up additional storage space.

Accordingly, it would be desirable to provide a system that allows for the efficient automatic management of data in a storage system throughout the data's lifecycle on each section of a logical volume.

SUMMARY OF THE INVENTION

According to the system described herein, a method of de-duplicating data may include providing a first volume including at least one pointer to a second volume that corresponds to physical storage space. The first volume may be a logical volume. A first set of data may be detected as a duplicate of a second set of data stored on the second volume at a first data chunk. A pointer of the first logical volume associated with the first set of data may be modified to point to the first data chunk, wherein, after modifying the pointer, no additional physical storage space is allocated for the first set of data. A counter associated with the first data chunk that identifies a number of pointers pointing to the data chunk may be updated. The first volume may include a thin device.

The second volume may be a physical storage area that contains the physical storage space or a logical volume that maps to allocations of the physical storage space. The first set of data may previously exist on the second volume, and the method may further include de-allocating physical storage space associated with the first set of data that previously existed on the second logical volume. The first set of data may be associated with a new write request and the method may further include intercepting the new write request after detecting that the first set of data of the new write request is a duplicate of the second set of data stored on the second logical volume. The first volume may include a first thin chunk and a second thin chunk, wherein the first thin chunk includes the pointer to the first data chunk of the second volume and the second thin chunk may include a pointer that points to the first thin chunk. A write request to change data associated with a particular one of the first set of data and the second data set may be intercepted. The particular one of the first set of data and the second set of data may be copied to a different data chunk. The pointer of the volume associated with the particular one of the first set of data and the second set of data may be modified to point to the different data chunk. A counter associated with the first data chunk may be decremented. The write request to change the particular one of the first set of data and the second data set may be performed at the different data chunk.

According further to the system described herein, a computer program product, stored on a computer-readable medium, for de-duplicating data includes executable code that provides a first logical volume including at least one pointer to a second volume that corresponds to physical storage space. Executable code may detect a first set of data as a duplicate of a second set of data stored on the second volume at a first data chunk. Executable code may modify a pointer of the first volume associated with the first set of data to point to the first data chunk, wherein, after modifying the pointer, no additional physical storage space is allocated for the first set of data. Executable code may update a counter associated with the first data chunk that identifies a number of pointers pointing to the data chunk. The second volume may be a physical storage area that contains the physical storage space or a logical volume that maps to allocations of the physical storage space. The first set of data may previously exist on the second volume, and the computer program product may further include executable code that de-allocates physical storage space associated with the first set of data that previously existed on the second logical volume. The first set of data may be associated with a new write request and the computer program product may further include executable code that intercepts the new write request after detecting that the first set of data of the new write request is a duplicate of the second set of data stored on the second volume.

According further to the system described herein, a computer storage device includes a plurality of interconnected directors, wherein at least some of the directors handle reading and writing data for the computer storage device and a plurality of disk drives, coupled to at least some of the directors, that store data for the computer storage device. Computer software, provided on a computer readable medium of at least one of the directors, may be included having executable code that provides a first volume including at least one pointer to a second volume that corresponds to physical storage space, wherein the first volume is a logical volume. Executable code may detect a first set of data as a duplicate of a second set of data stored on the second volume at a first data chunk. Executable code may modify a pointer of the first volume associated with the first set of data to point to the first data chunk, wherein, after modifying the pointer, no additional physical storage space is allocated for the first set of data. Executable code may update a counter associated with the first data chunk that identifies a number of pointers pointing to the data chunk. The second volume may be a physical storage area that contains the physical storage space or a logical volume that maps to allocations of the physical storage space. The first set of data may previously exist on the second volume, and the computer software may further include executable code that de-allocates physical storage space associated with the first set of data that previously existed on the second logical volume. The first set of data may be associated with a new write request and the computer software may further include executable code that intercepts the new write request after detecting that the first set of data of the new write request is a duplicate of the second set of data stored on the second volume.

According further to the system described herein, a computer storage system includes a remote storage device and a local storage device coupled to the remote storage device via a data link, the local storage device having at least one processor that controls a first logical volume of the local storage device, the first logical volume including at least one pointer to a second volume of the local storage device that corresponds to physical storage space, where in response to the local storage device detecting duplicate data prior to transmission of the data to the second storage device, the local storage device transmits information indicative of the duplicate data instead of the data. The second volume may be a physical storage area that contains the physical storage space and/or a logical volume that maps to allocations of the physical storage space. The first set of data may be associated with a new write request, and the processor may intercept the new write request after detecting that the first set of data of the new write request is a duplicate of the second set of data stored on the second volume. The remote storage device may update a counter associated with the data that identifies a number of pointers pointing to the data chunk. Following transmitting the information indicative of duplicate data, the local storage device may provide an acknowledgement.

According further to the system described herein, cloning data includes providing a first volume including at least one pointer to a second volume that corresponds to physical storage space, where the least one pointer of the first volume points to a data chunk stored on the second volume, and where the first volume is a logical volume, providing a third volume including at least one pointer, where the third volume is another logical volume, and modifying the at least one pointer of the third volume to point to the data chunk without allocating any additional physical storage space. Cloning data may also include updating a counter associated with the data chunk to indicate that more than one logical volume points to the data chunk. The second volume may be a physical storage area that contains the physical storage space and/or a logical volume that maps to allocations of the physical storage space.

A system may be provided having at least one processor that performs any of the above-noted steps. A computer program product, stored on a computer-readable medium, for de-duplicating data may be provided including executable code for performing any of the above-noted steps.

BRIEF DESCRIPTION OF THE DRAWINGS

Embodiments of the system are described with reference to the several figures of the drawings, described as follows.

FIG. 22B illustrates the flow diagram showing de-duplication processing for detection of existing instances of duplicate data.

DETAILED DESCRIPTION OF VARIOUS EMBODIMENTS

Referring now to the figures of the drawings, the figures comprise a part of this specification and illustrate exemplary embodiments of the described system. It is to be understood that in some instances various aspects of the system may be shown schematically or may be shown exaggerated or altered to facilitate an understanding of the system.

Figure 1A:
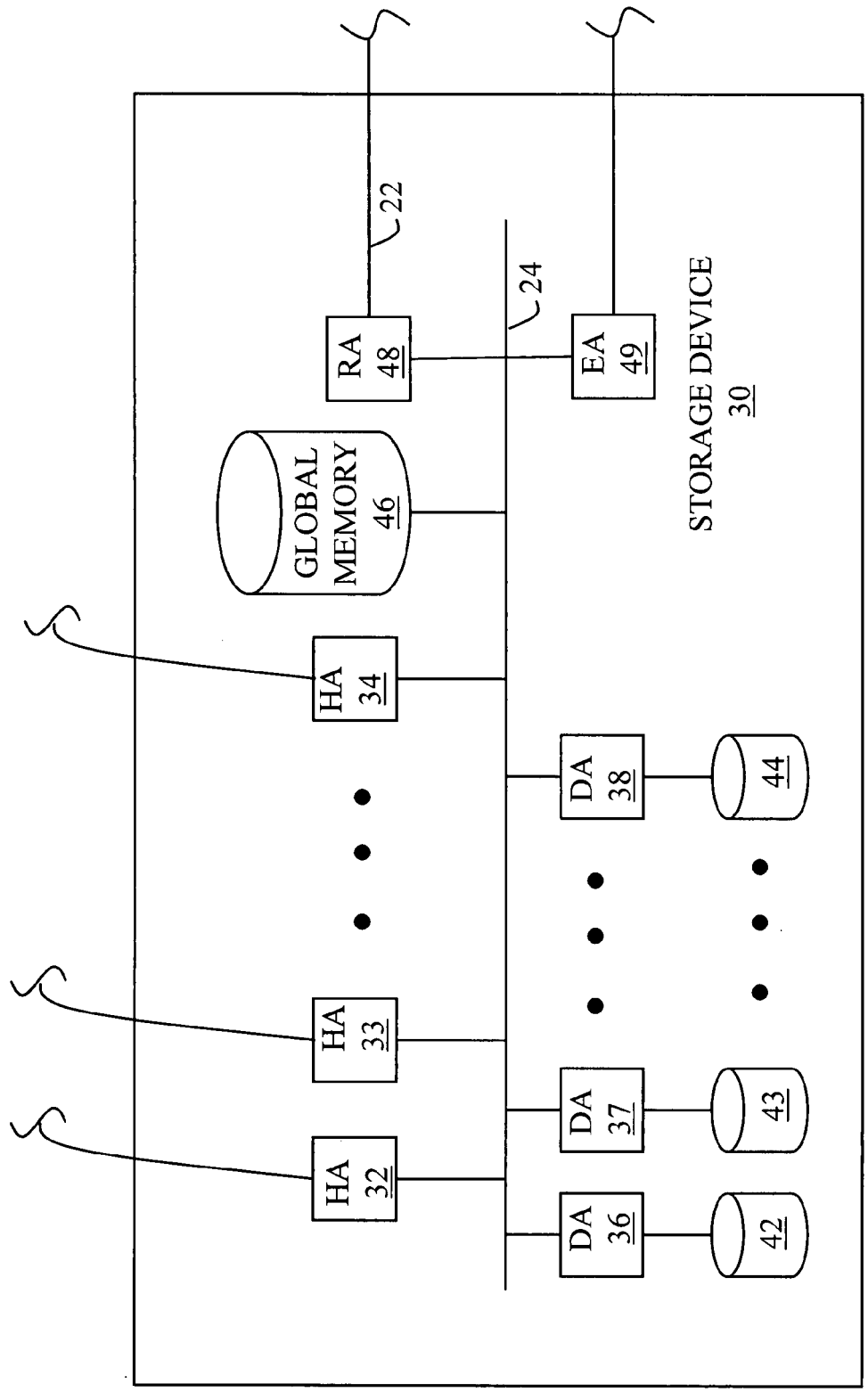
FIG. 1A is a schematic diagram showing a plurality of hosts and a data storage device in connection with an embodiment of the system described herein.

FIG. 1A is a schematic illustration showing a storage device 30 that includes a plurality of host adapters (HA) 32-34, a plurality of disk adapters (DA) 36-38 and a plurality of disk drives 42-44. The disk drives 42-44 should be understood as representing any appropriate type of storage media, including, without limitation, DRAM cache, flash or other solid-state storage device, tape, optical media, and/or any combination of permanent, semi-permanent and temporally-limited storage media. Each of the disk drives 42-44 is coupled to a corresponding one of the DA's 36-38. Although FIG. 1A shows a one-for-one correspondence between the DA's 36-38 and the disk drives 36-38, it should be understood that it is possible to couple more than one disk drive to a DA and/or to couple more than one DA to a disk drive. The storage device 30 also includes a global memory 46 that may be accessed by the HA's 32-34 and the DA's 36-38. The storage device 30 also includes an RDF (Remote Data Facility) adapter (RA) 48 that may also access the global memory 46. The RA 48 may communicate with one or more additional remote storage devices and/or one or more other remote devices via a data link 22. The storage device also includes an external storage adaptor (EA) 49 that may be used to communicate with one or more other storage devices that could either be the same type of storage device as the storage device 30 or could be a different type of storage device. The HA's 32-34, the DA's 36-38, the global memory 46, the RA 48 and the EA 49 may be coupled to a bus 24 that is provided to facilitate communication therebetween. In various embodiments, additional RA's and/or EA's may be incorporated into the storage device 30.

Figure 1B:
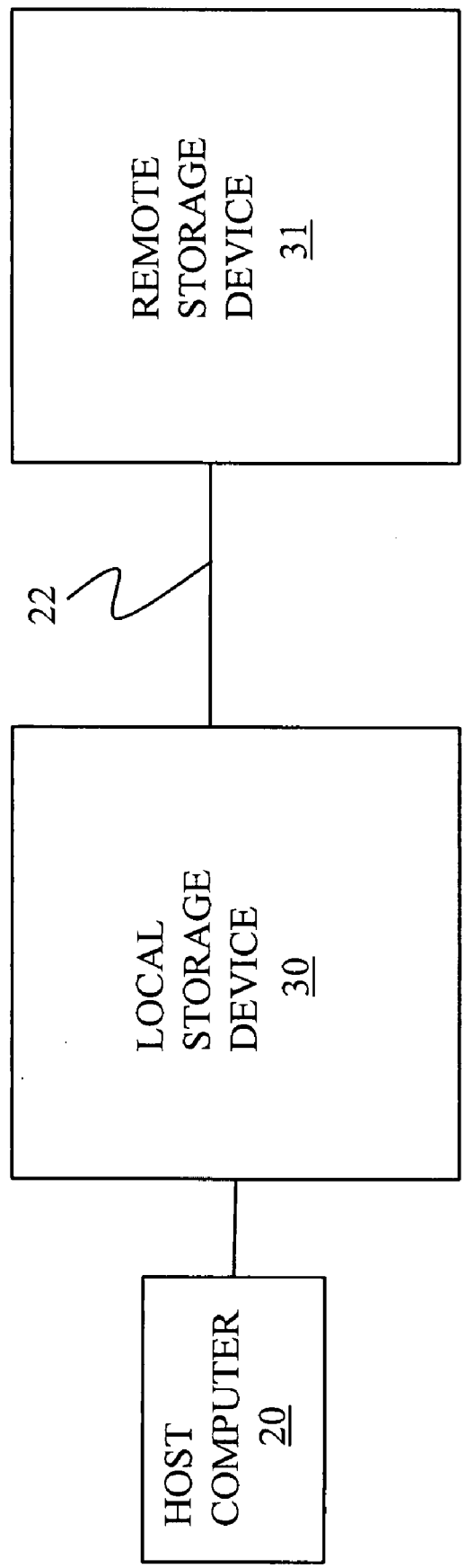
FIG. 1B is a schematic diagram showing a local storage device coupled to a remote storage device via a data link.

FIG. 1B is a schematic diagram showing the storage device 30, as a local storage device, coupled to a remote storage device 31 via the data link 22. The remote storage device 31 may be the same type of storage device as the storage device 30 and/or may be a different type of storage device. The local storage device 30 and the remote storage device 31 may operate as an RDF product for providing backup and/or mirrored copies of data, as further discussed elsewhere herein.

Each of the HA's 32-34 of the storage device 30 may be coupled to one or more host computers 20 that access the storage device 30. The host computers (hosts) access data on the disk drives 42-44 through the HA's 32-34 and the DA's 36-38. The global memory 46 contains a cache memory that holds tracks of data read from and/or to be written to the disk drives 42-44 as well as storage for tables that may be accessed by the HA's 32-34, the DA's 36-38, the RA 48, and the EA 49. Note that, for the discussion herein, blocks of data are described as being a track or tracks of data. However, it will be appreciated by one of ordinary skill in the art that the system described herein may work with any appropriate incremental amount, or section, of data, including possibly variable incremental amounts of data and/or fixed incremental amounts of data and/or logical representations of data, including (but not limited to) compressed data, encrypted data, or pointers into de-duplicated data dictionaries.

Figure 2:
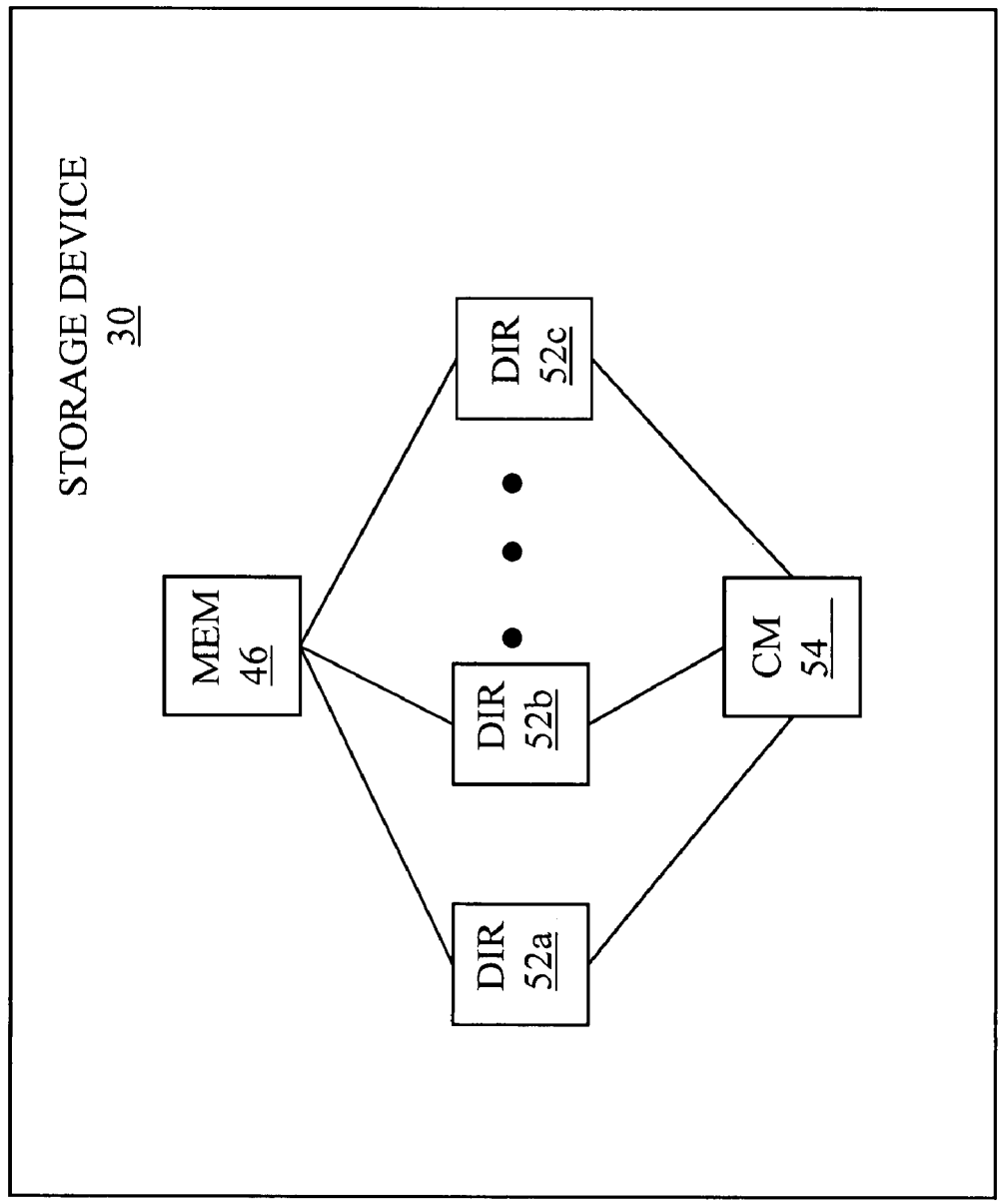
FIG. 2 is a schematic diagram showing a storage device, memory, a plurality of directors, and a communication module in connection with an embodiment of the system described herein.

FIG. 2 is schematic diagram showing an embodiment of the storage device 30 where each of a plurality of directors 52a-52c are coupled to the memory 46. Each of the directors 52a-52c may represent one or more of the HA's 32-34, the DA's 36-38, the RA 48 and/or the EA 49. In an embodiment disclosed herein, there may be up to sixty-four directors coupled to the memory 46. Of course, for other embodiments, there may be a higher or lower maximum number of directors that may be used.

FIG. 2 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 46. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of different types of director and perform other processing with the other processing system. Generally, the system described herein could work with any appropriate hardware configuration, including configurations where at least some of the memory 46 is distributed among at least some of the directors 52a-52c and in configurations where a number of core processors are coupled to a generic interface card.

The system described herein is suitable for use with the technique of thin provisioning. Thin provisioning allows for the creation of logical volumes of storage space where allocation of physical storage space occurs only when space is actually needed (e.g., when data is written in the first time to the storage space). Logical storage space may be identified to a user as being available even though no physical storage space has been committed, at least initially. When data is written to the logical storage space, physical storage space is drawn for use from a pool of physical storage space, as further described elsewhere herein. In addition, as described in more detail elsewhere herein, stored data may be moved between physical locations using the storage infrastructure described herein.

Figure 3:
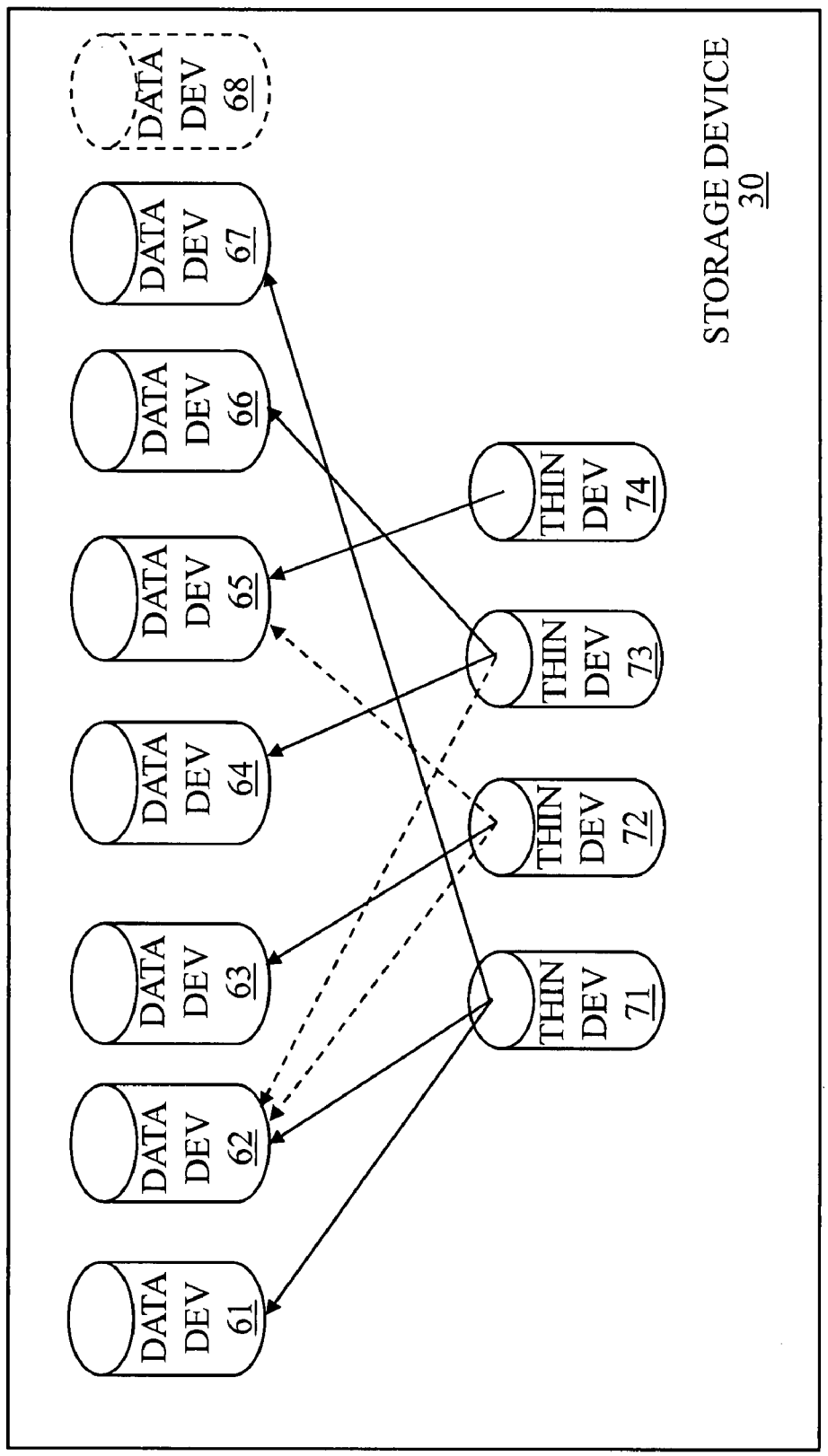
FIG. 3 is a schematic diagram showing a storage device including thin devices and data devices in connection with an embodiment of the system described herein.

FIG. 3 is a schematic diagram showing the storage device 30 as including a plurality of data devices 61-68. Data devices 61-67 may be implemented as logical devices like standard logical devices provided in a Symmetrix data storage device. In some embodiments, the data devices 61-67 may not be directly useable (visible) to hosts coupled to the storage device 30. Each of the data devices 61-67 may correspond to a portion (including a whole portion) of one or more of the disk drives 42-44. Thus, for example, the data device 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. The data device 68 is illustrated with broken lines to indicate that the data device 68 does not yet exist but may be created, as further discussed elsewhere herein.

The storage device 30 may also include one or more thin devices 71-74. Each of the thin devices 71-74 may appear to a host coupled to the storage device 30 as a logical volume (logical device) containing a contiguous block of data storage. Each of the thin devices 71-74 may contain tables that point to some or all of the data devices 61-67 (or portions thereof), as further discussed elsewhere herein. In some instances, the thin devices 71-74 may be concatenated to form a metavolume of thin devices. In some embodiments, only one thin device may be associated with the same data device while, in other embodiments, multiple thin devices may be associated with the same data device, as illustrated in the figure with arrows having broken lines.

In some embodiments, it may be possible to implement the system described herein using storage areas, instead of storage devices. Thus, for example, the thin devices 71-74 may be thin storage areas, the data devices 61-67 may be standard logical areas, and so forth. In some instances, such an implementation may allow for hybrid logical devices where a single logical device has portions that behave as a data device and/or portions that behave as a thin device. Accordingly, it should be understood that, in appropriate instances, references to devices in the discussion herein may also apply to storage areas that may or may not correspond directly with a storage device.

Figure 4:
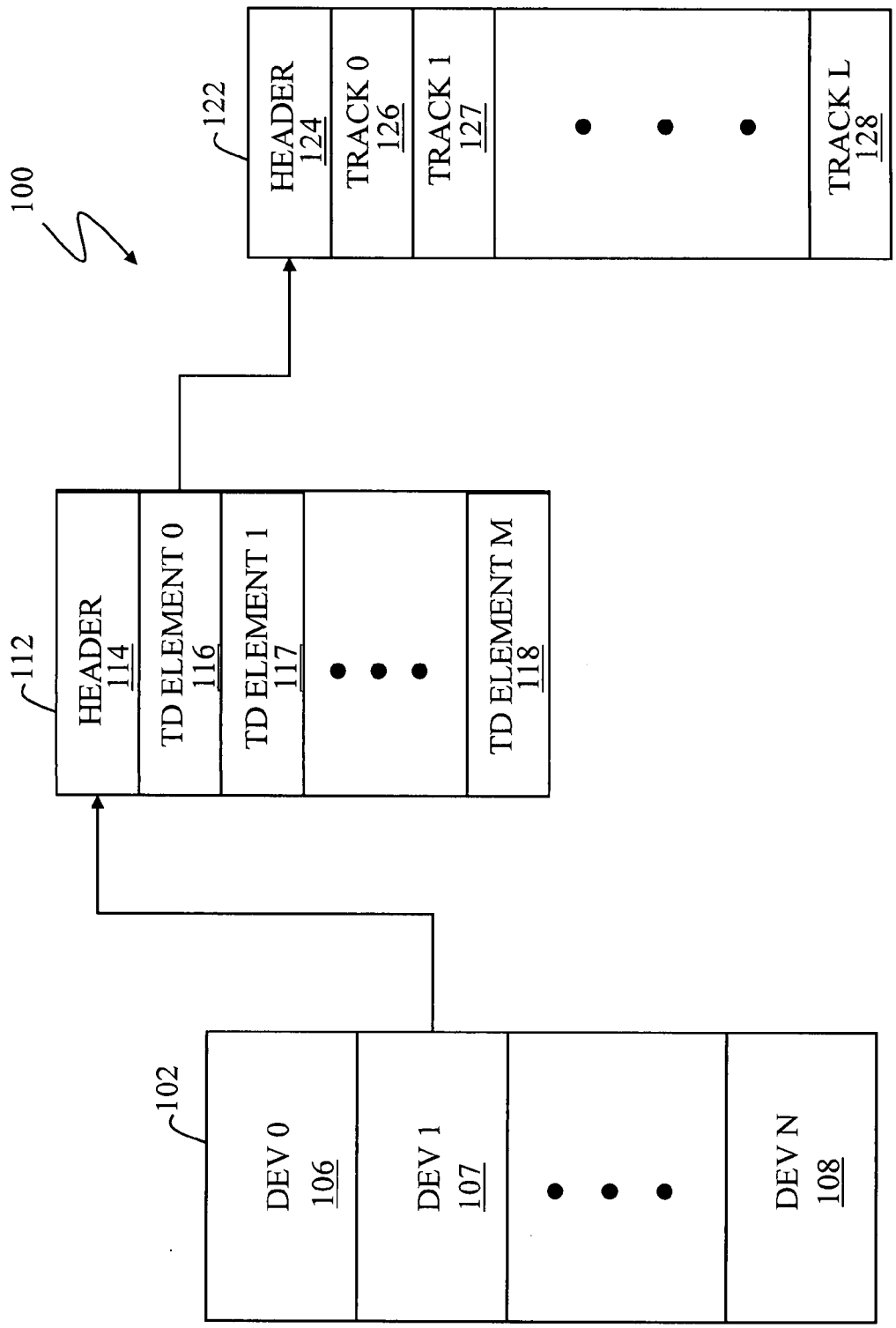
FIG. 4 is a schematic diagram illustrating tables that are used to keep track of device information in connection with an embodiment of the system described herein.

FIG. 4 is a diagram 100 illustrating tables that are used to keep track of device information. A first table 102 corresponds to all of the devices used by a storage device or by an element of a storage device, such as an HA and/or a DA. The table 102 includes a plurality of logical device (logical volume) entries 106-108 that correspond to all the logical devices used by the storage device (or portion of the storage device). The entries in the table 102 may include information for thin devices, for data devices, for standard logical devices, for virtual devices, for BCV devices, and/or any or all other types of logical devices used in connection with the system described herein.

Each of the entries 106-108 of the table 102 correspond to another table that may contain information for one or more logical volumes, such as thin device logical volumes. For example, the entry 107 may correspond to a thin device table 112. The thin device table 112 may include a header 114 that contains overhead information, such as information identifying the corresponding thin device, information concerning the last used data device and/or other information including counter information, such as a counter that keeps track of used group entries (described below). The header information, or portions thereof, may be available globally to the storage device 30.

The thin device table 112 may include one or more group elements 116-118, that contain information corresponding to a group of tracks on the data device. A group of tracks may include one or more tracks, the number of which may be configured as appropriate. In an embodiment herein, each group has sixteen tracks, although this number may be configurable or dynamically adjustable based on criteria described elsewhere herein.

One of the group elements 116-118 (for example, the group element 116) of the thin device table 112 may identify a particular one of the data devices 61-67 having a track table 122 that contains further information, such as a header 124 having overhead information and a plurality of entries 126-128 corresponding to each of the tracks of the particular one of the data devices 61-67. The information in each of the entries 126-128 may include a pointer (either direct or indirect) to the physical address on one of the disk drives 42-44 of the storage device 30 (or a remote storage device if the system is so configured) that maps to the logical address(es) of the particular one of the data devices 61-67. Thus, the track table 122 may be used in connection with mapping logical addresses of the logical devices corresponding to the tables 102, 112, 122 to physical addresses on the disk drives 42-44 of the storage device 30.

The tables 102, 112, 122 may be stored in the global memory 46 of the storage device 30. In addition, the tables corresponding to particular logical devices accessed by a particular host may be stored (cached) in local memory of the corresponding one of the HA's 32-36. In addition, the RA 48 and/or the DA's 36-38 may also use and locally store (cache) portions of the tables 102, 112, 122.

Figure 5:
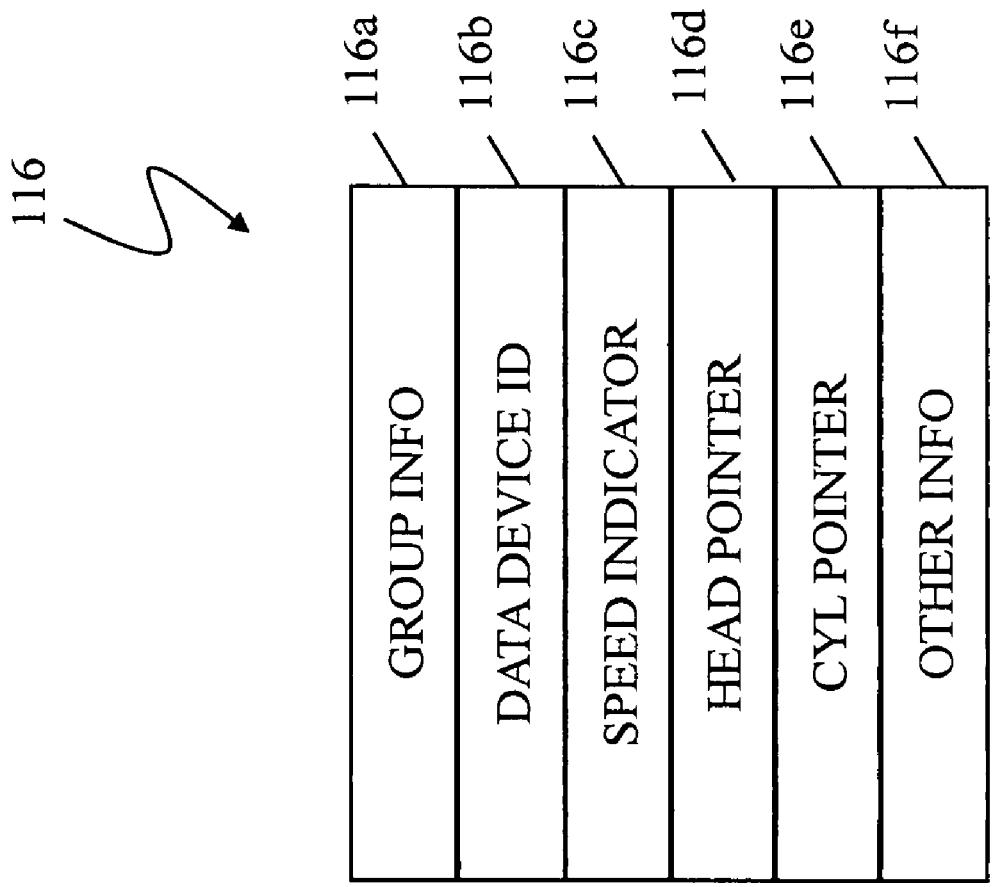
FIG. 5 is a schematic diagram showing a group element of a thin device table in connection with an embodiment of the system described herein.

FIG. 5 is a schematic diagram illustrating a group element 116 of the thin device table 112 in connection with an embodiment of the system described herein. The group element 116 may includes a plurality of entries 116a-116f. The entry 116a may provide group information, such as a group type that indicates whether there has been physical address space allocated for the group. The entry 116b may include information identifying one (or more) of the data devices 61-67 that correspond to the group (i.e., the one of the data devices 61-67 that contains pointers for physical' data for the group). The entry 116c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive, RAID protection type, numbered of mirrored copies, etc.). The entry 116d may be a pointer to a head of the first allocated track for the one of the data devices 61-67 indicated by the data device ID entry 116b. Alternatively, the entry 116d may point to header information of the data device track table 122 immediately prior to the first allocated track. The entry 116e may identify a cylinder of a first allocated track for the one the data devices 61-67 indicated by the data device ID entry 116b. The entry 116f may contain other information corresponding to the group element 116 and/or the corresponding thin device. In other embodiments, entries of the group table 116 may identify a range of cylinders of the thin device and a corresponding mapping to map cylinder/track identifiers for the thin device to tracks/cylinders of a corresponding data device. In an embodiment, the size of the group element 116 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives 42-44. Thus, an access of the logical storage space of the thin device results in either a null pointer (or equivalent) indicating that no corresponding physical storage space has yet been allocated, or results in a reference to a data device which in turn references the underlying physical storage space.

Figure 6:
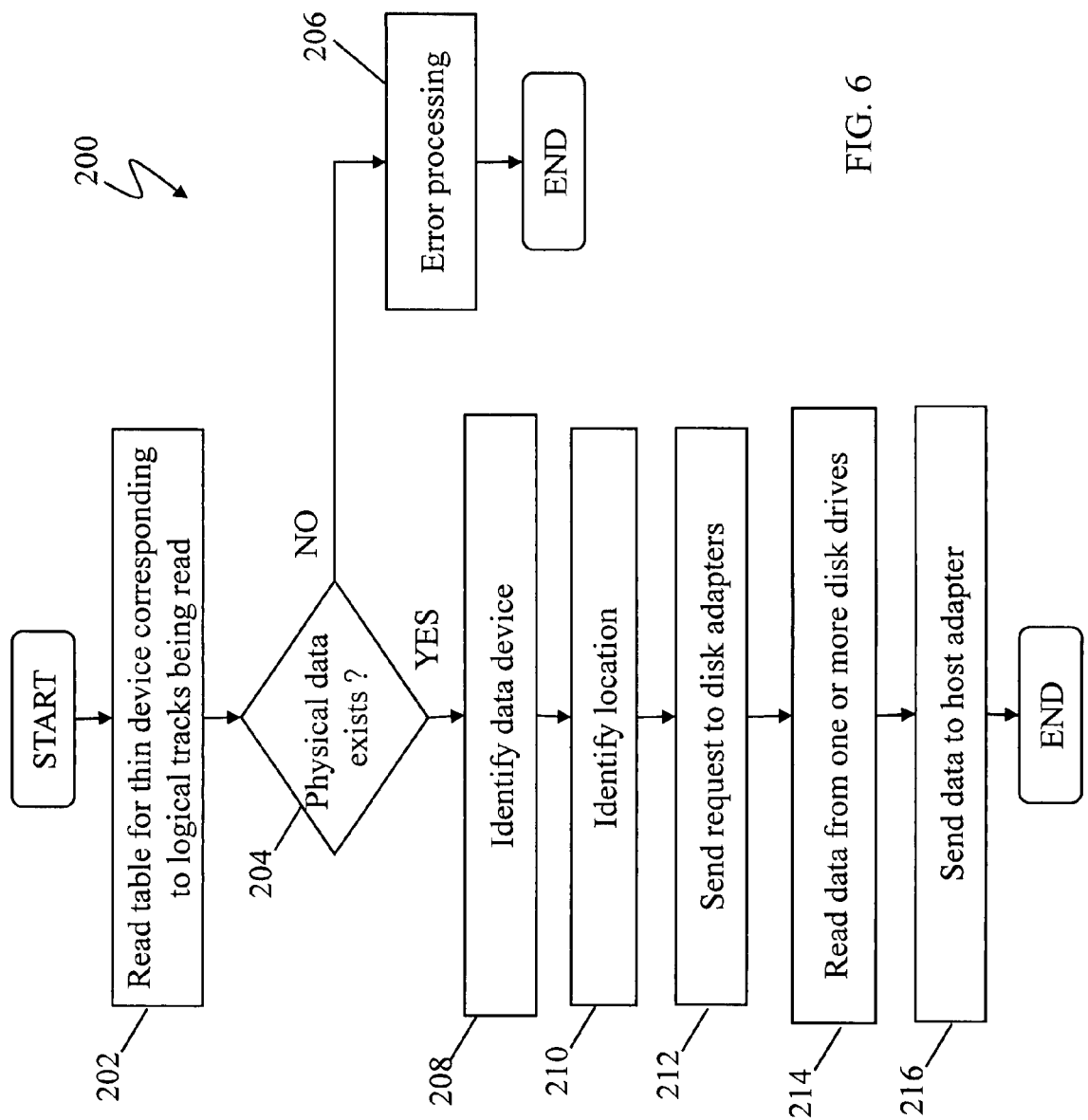
FIG. 6 is a flow diagram illustrating processing for handling a read of one or more logical tracks of a thin device in connection with an embodiment of the system described herein.

FIG. 6 is a flow diagram 200 illustrating processing for handling a read of one or more logical tracks of one of the thin devices 71-74 in an embodiment of the system described herein. In a step 202, an appropriate one of the host adapters 32-34 reads the group table 112 of the one of the thin devices 71-74 corresponding to the logical tracks being read. After the step 202, at a test step 204, it is determined whether the logical tracks identified from the group table 112 corresponds to any of the data devices 61-67 (i.e., if there is physical data corresponding to the logical tracks being read). If there is no corresponding physical data (meaning that no logical track(s) were ever written), then processing proceeds to a step 206 where error processing is performed, such as returning a NULL value to the host. Other appropriate error processing may be performed at the step 206. After the step 206, processing is complete.

If it is determined at the step 204 that there is physical data corresponding to the logical tracks being read, then processing proceeds to a step 208 where one or more of the data devices 61-67 associated with the logical tracks being read are identified from the group table 112. After the step 208, processing proceeds to a step 210 where the track table 122 is read from the identified one or more of the data devices 61-67 and the corresponding location of the physical data (i.e., cylinder and track) is determined. As further discussed elsewhere herein, physical storage space may be provided in connection with one data device and/or by a concatenation of multiple data devices or portions thereof. Logical storage space of the physical devices maps to logical storage space. After the step 210, processing proceeds to a step 212 where a request may be sent to one or more disk adapters 36-38 corresponding to disk drives 42-44 that provide the physical storage space associated with the identified one of the data devices 61-67 and corresponding location information. After the step 212, processing proceeds to a step 214 where the physical data is read. Note that the data may be stored in a cache or other memory (for example, the memory 46) in connection with being read. In some cases, if the data being read is already in the cache, then the processing at the step 212 and following steps may not be necessary. Note also that reading the data may include updating any metadata used to provide the processing described herein, such as the time last accessed, the host/user making the request, frequency of use, and/or any other appropriate metric. After the step 214, processing proceeds to a step 216 where the data may be received by an appropriate one of the host adapters 32-34 (e.g., by reading the memory 46). After the step 216, processing is complete.

Figure 7:
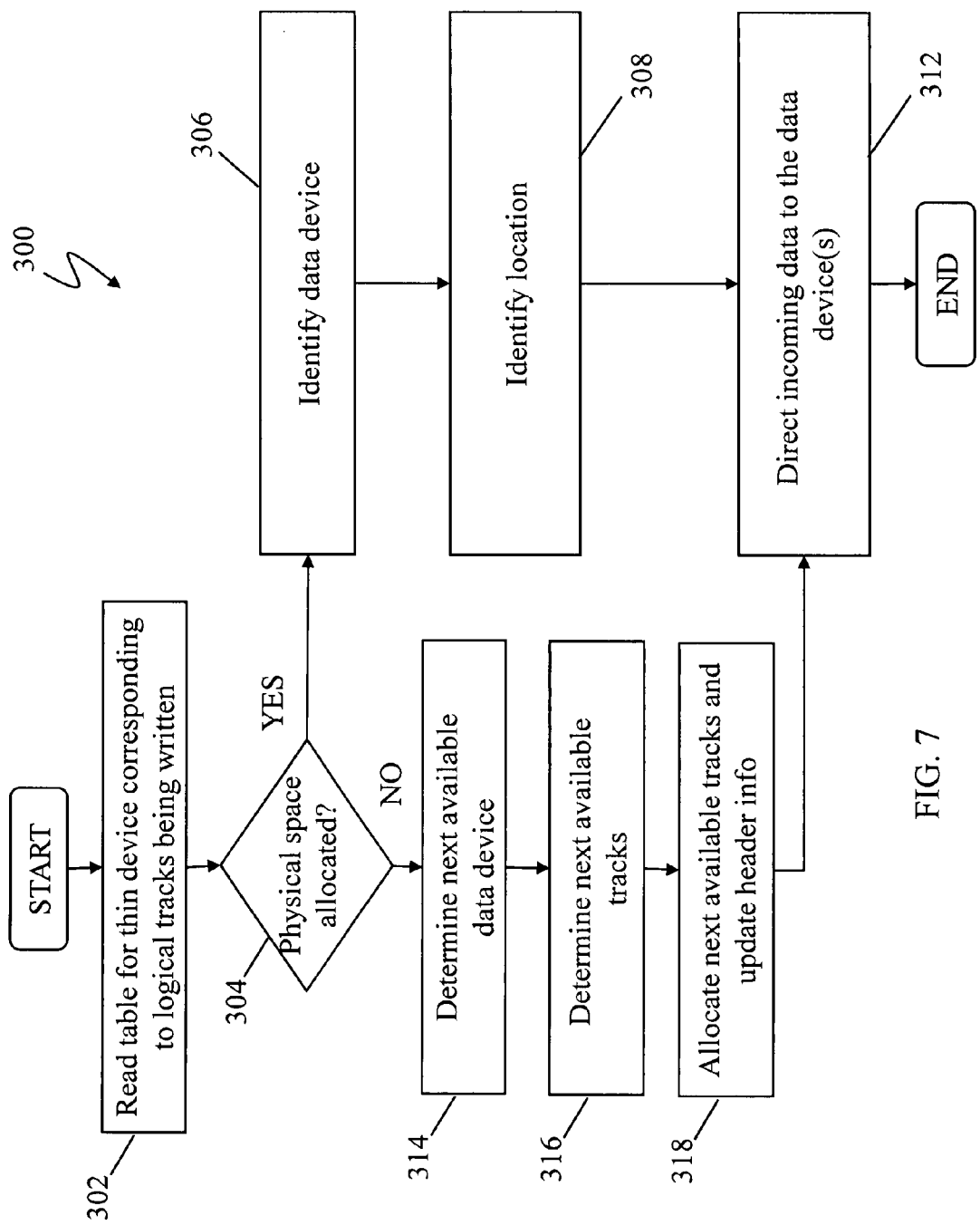
FIG. 7 is a flow diagram illustrating processing for handling a write of one or more logical tracks to the thin device in connection with an embodiment of the system described herein.

FIG. 7 is a flow diagram 300 illustrating processing for handling a write of logical track(s) to one or more of the thin device(s) 71-74 in connection with the system described herein. At a step 302, an appropriate one of the host adapters 32-34 reads the group table 112 of the one of the thin device(s) 71-74 corresponding to the logical tracks being written.

Following the step 302 is a test step 304 where it is determined whether physical space had been previously allocated (i.e., in a prior write operation) for the logical tracks being written. If so, then processing proceeds to a step 306 where the data device that includes the logical tracks is identified. After the step 306, is a step 308 where the track table 122 is read from the identified one or more of the data devices 61-67 and the corresponding location of the physical data (i.e., cylinder and track) is determined. As further discussed elsewhere herein, physical storage space may be provided in connection with one data device and/or by a concatenation of multiple data devices or portions thereof. Logical storage space of the physical devices maps to logical storage space. Following the step 308 processing proceeds to a step 312 where the data being written is directed to the appropriate physical storage space. The incoming data overwrites the appropriate portion of the data where directed. After the step 312, processing is complete.

If it is determined at the step 304 that there is no physical storage that has been allocated for the logical track(s) being written, then control transfers from the step 304 to a step 314, where a next available data device identifier (i.e., the data device 68) is determined. This information may be obtained from the header 114 of the device table 112. In an embodiment herein, data device identifiers are provided by numbers so that a next available data device identifier is simply one more than a last allocated data device. However, as discussed in more detail elsewhere herein, selection of a data device at the step 314 may include application of other criteria.

After the step 314, processing proceeds to a step 316 where available physical storage space on the disk drives 42-44 is determined. In an embodiment herein, available physical storage space is allocated sequentially from one or more of the disk drives 42-44. Following the step 316 is a step 318 where a request may be sent to a disk adapter 36-38 (or possibly the RA 48 and/or the EA 49) to allocate the physical storage space for the write. Also at the step 318, header info is updated to reflect the newly allocated data device and physical tracks. After the step 318, processing proceeds to the step 312, discussed above, where the data being written is directed to the one or more data devices. After the step 312, processing is complete.

After the read and write processes illustrated in FIGS. 6 and 7, information concerning access of the data, such as access frequency, time of last access or use and/or other characteristics and statistics, may be updated and stored by the system described herein. The updated data access information or other characteristic information of the data and/or any portion of the data may, for example, be stored as an entry in a group element of the thin device table 112 (for example, the entry 116*f* of the group element 116 as shown in FIG. 5). Alternatively, the data characteristic information may be stored in a memory, such as the global memory 46 of the storage device 30, and a pointer to this information stored in the group element 116. Other implementations for storing and access of the data characteristic information are possible.

The allocation of the physical storage space for a thin device at the time of writing the data, as well as the policies that govern the allocation, may be transparent to a user. For example, a user's inquiry into how much storage space is available on a particular thin device may indicate a maximum amount of physical storage space that could be allocated for a thin storage device (provisioned storage space) even though the corresponding physical storage space had not yet been allocated. In an alternative embodiment, the policy for the thin device may be to report something less than the total maximum that could be allocated. In some embodiments, used physical storage space may not exceed 30% of the provisioned storage space.

In an embodiment herein, different portions of the physical data may be automatically moved between different physical disk drives or other storage devices with the same or different characteristics according to one or more policies. For example, data may be initially allocated to a particular fast disk drive, but a portion of the data that has not been used over a period of time (for example, three weeks) may be automatically moved, according to the system described herein, to a slower (and perhaps less expensive) disk drive. The physical data may then be automatically moved back to the faster disk drive if the data is subsequently used and/or accessed according to a policy or other criteria (for example, accessed twice in any given week), as further described herein. Thus, the system described herein may operate to automatically move data between disk drives or other storage devices within the same machine according to the one or more policies.

A policy may be configured by an administrator on a system-wide level or may be specific to a particular user on a specific logical device. The system described herein allows for the remapping of physical data based on policy criteria or other statistics. For example, the policy may be based on the last time data was used and/or accessed. Alternatively, the policy may be based on anticipated use of data over specific times and/or dates. For example, data that is expected to be used at a particular time may be stored on (or relocated to) relatively fast disk drives and then moved to relatively slow disk drives when it is expected that the data will not be used again for a lengthy period of time. Moreover, different policies and/or criteria may be implemented corresponding to different users and/or different levels of importance or security of data. For example, it may be known that user A accesses particular data more frequently than user B and, accordingly, the policy for moving physical data according to the system described herein may be to leave more data associated with user A on the relatively fast disk drive as compared with the data associated with user B. Alternatively, user A may access data that is generally of a higher level of importance or requires higher security than that of user B and, accordingly, the system described herein may maintain and/or move more data associated with user A on a disk drive that is relatively more reliable, available and/or secure as compared with the data associated with user B.

In an embodiment herein, data may be moved between physical disk drives (or other physical storage) having different characteristics, such as speed, cost, reliability, availability, security and/or other characteristics. As discussed elsewhere herein, logical data devices may be established having different classes corresponding to characteristics of the physical disk drives to which the data devices are mapped. Further, it should be noted that any section of the logical device may be moved according to the system described herein based on the characteristics of the data (and governed by default or specific policies).

Figure 8:
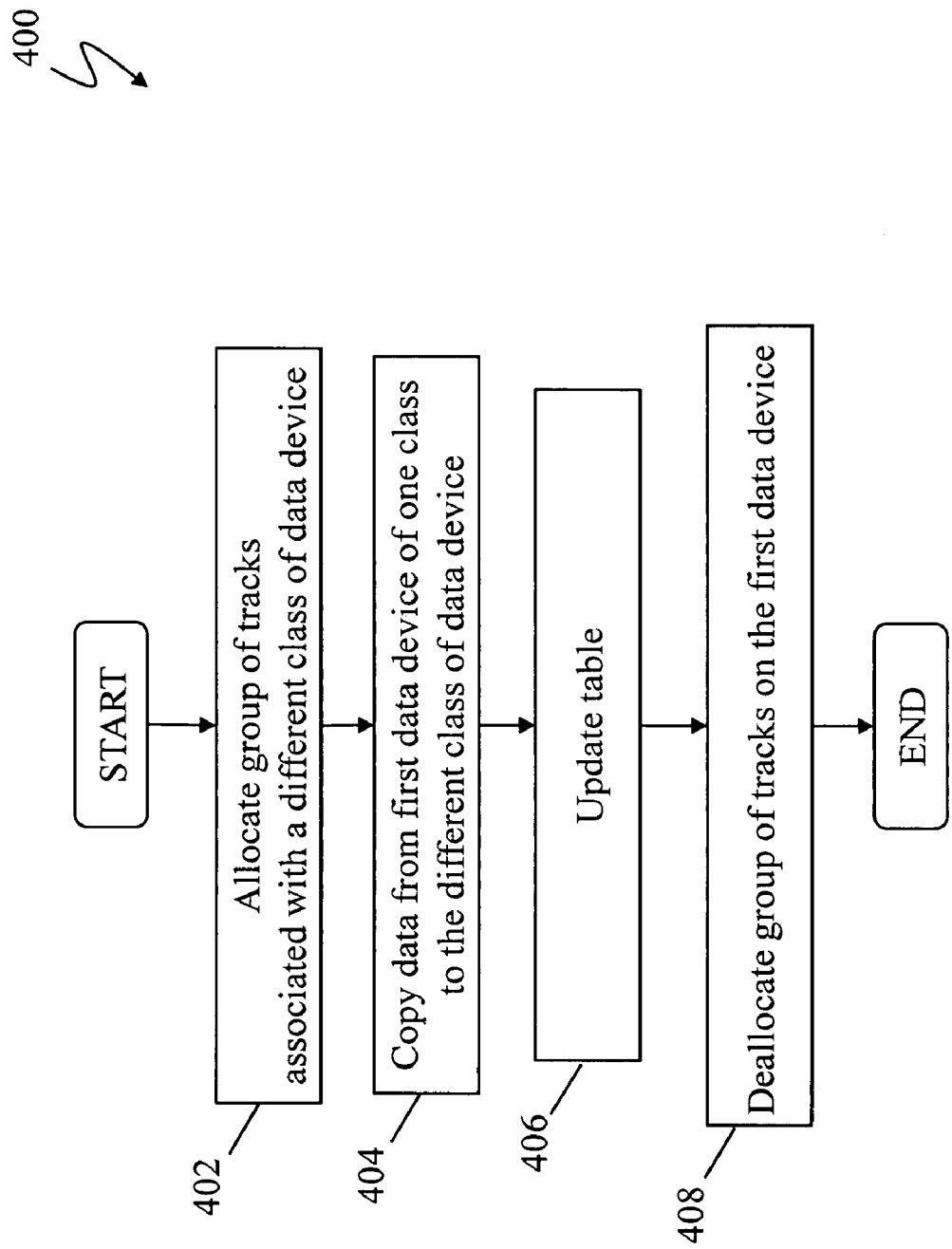
FIG. 8 is a flow diagram illustrating processing for copying and remapping physical data within a storage device in connection with an embodiment of the system described herein.

FIG. 8 is a flow diagram 400 illustrating processing for copying and remapping physical data according to the system described herein. In a step 402, a group of tracks is allocated on a data device having a second class than a data device of a first class, where the first and second classes are different. For example, the data device having a different class may be mapped to a physical disk drive that is slower than that of the data device of the first class, as further discussed elsewhere herein. After the step 402, processing proceeds to a step 404 where data associated with the data device of the first class is copied to a location corresponding to the data device of the second class. After the step 404, processing proceeds to a step 406 where the group table of the thin device is updated in accordance with the remapping. After the step 406, processing proceeds to a step 408 where the group of tracks associated with the data device of the first class, from which the data was copied, is deallocated, freeing the locations for future use.

Figure 9:
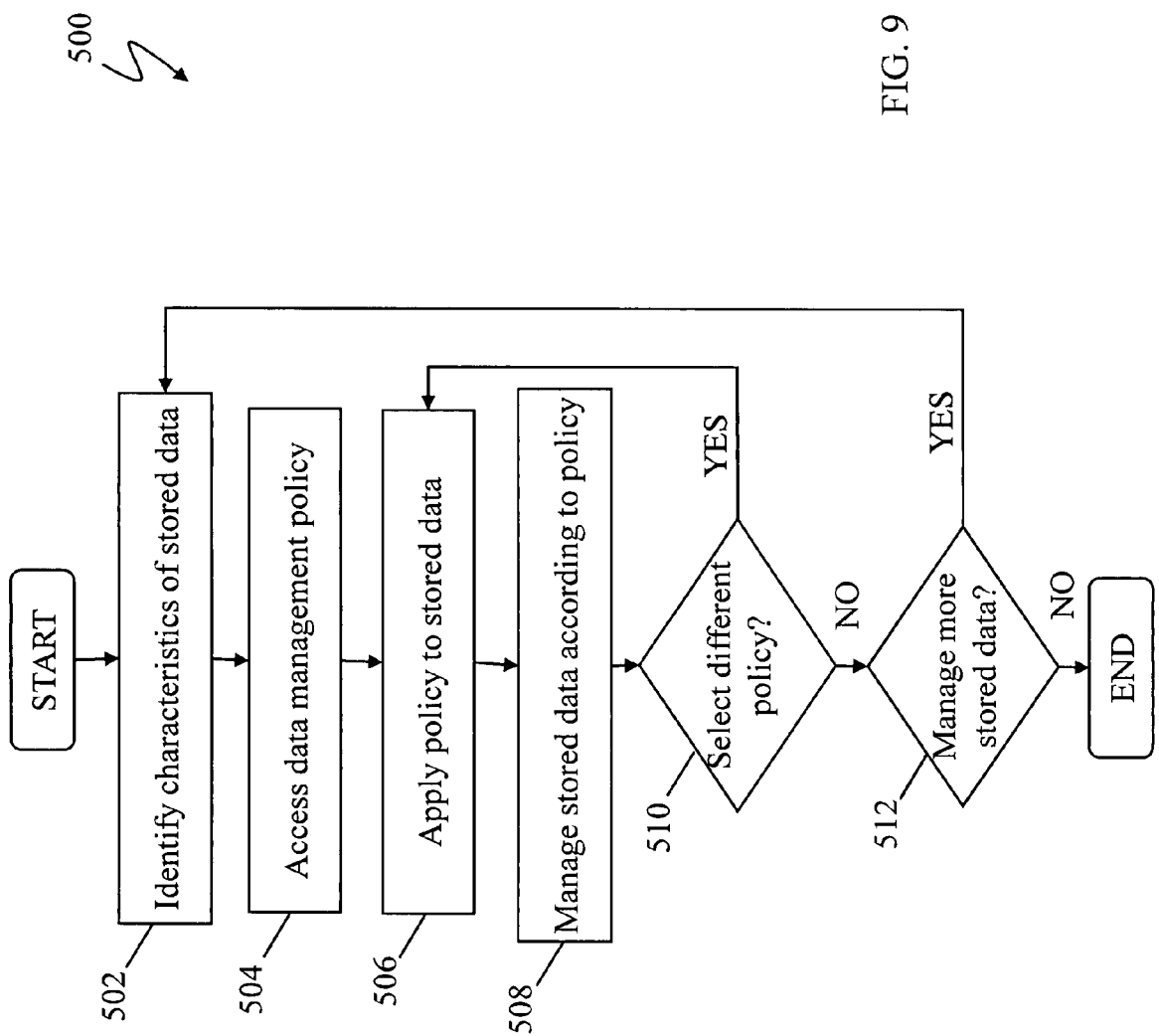
FIG. 9 is a flow diagram illustrating implementation of a policy to data storage and management in connection with an embodiment of the system described herein.

FIG. 9 is a flow diagram 500 illustrating implementation of a policy for data storage and management in connection with an embodiment of the system described herein. In a step 502, certain characteristics of stored data are identified (for example, from the group element 116, as discussed elsewhere herein). In various embodiments, the characteristics may include usage information such as when the stored data was last accessed and/or how often the stored data has been accessed over a specific time period (for example, hours, days, weeks, etc. . . . ). It is also possible to determine how long (on average or in aggregate) it has taken to service each specific I/O request to the data. As further discussed elsewhere herein, the characteristics may also include particular user information corresponding to the stored data. After the step 502, processing proceeds to a step 504 where policy information is accessed. The policy information provides the specific criteria used for data storage and management.

After the step 504, processing proceeds to a step 506 where the policy is applied to the stored data. The policy may include criteria used for managing stored data such as criteria concerning frequency of use of data and/or criteria with respect to specific users and/or other criteria, such as file name, file type, file path, requesting application, expected time to re-use of the data, temporary storage only, life expectancy of the data, data type (e.g., compressed, encrypted, de-duped) and/or protection requirements of the data (e.g., store on an encrypted tier). The policy may be applied to identify data for lifecycle management according to characteristics of entire data volumes or any portions thereof. The policy may also consider the access history, effective performance or other characteristics about the data that might be utilized to optimize the performance, cost, availability or retention requirements of the data.

After the step 506, processing proceeds to a step 508 where the data for which characteristics have been determined is managed according to the policy and based on the characteristics of the data. For example, data that is frequently used may be moved to a relatively fast storage device whereas data that has not been used over a certain period of time may be moved to a relatively slow storage device according to the data processing as discussed elsewhere herein. As noted herein, the data that is moved may be entire data volumes or portions thereof.

After the step 508, processing proceeds to a test step 510 where it is determined if another policy with other criteria should be applied to the stored data being managed. If an additional policy is to be applied, then processing proceeds to the step 506. If no further policies are to be applied then processing proceeds to a test step 512 where it is determined whether there is more data to be managed according to the system described herein. If there is further stored data to manage, then processing proceeds back to the step 502. If no further stored data is to be managed, then after the test step 512, processing is complete. In some cases, tracking, avoiding and resolving conflicting priorities would be handled to ensure that two policies do not create a "ping-pong" effect, moving data blocks up- and down- in a never ending cycle.

As discussed elsewhere herein, the data devices 61-67 may be associated with physical storage areas (e.g., disk drives, tape, solid state storage, etc.) having different characteristics. In various embodiments, the physical storage areas may include multiple tiers of storage in which each tier of storage areas and/or disk drives that may be ordered according to different characteristics and/or classes, such as speed, technology and/or cost. The thin devices 71-74 may appear to a host coupled to the storage device 30 as a logical volume (logical device) containing a contiguous block of data storage, as discussed herein. Each thin device 71-74 may correspond to a particular data device, a portion thereof and/or multiple data devices. Accordingly, each thin device 71-74 may map to storage areas across multiple storage tiers. As a result, although each thin device 71-74 may appear as containing a logically contiguous block of storage, each thin device 71-74 may allow for blocks of data to be transparently stored (and/or retrieved) from discontiguous storage pools made up of the varying classes of data storage devices. In this way, the granularity at which the system for tiered storage described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage tiers or different sized data blocks within a single storage tier.

Figure 10:
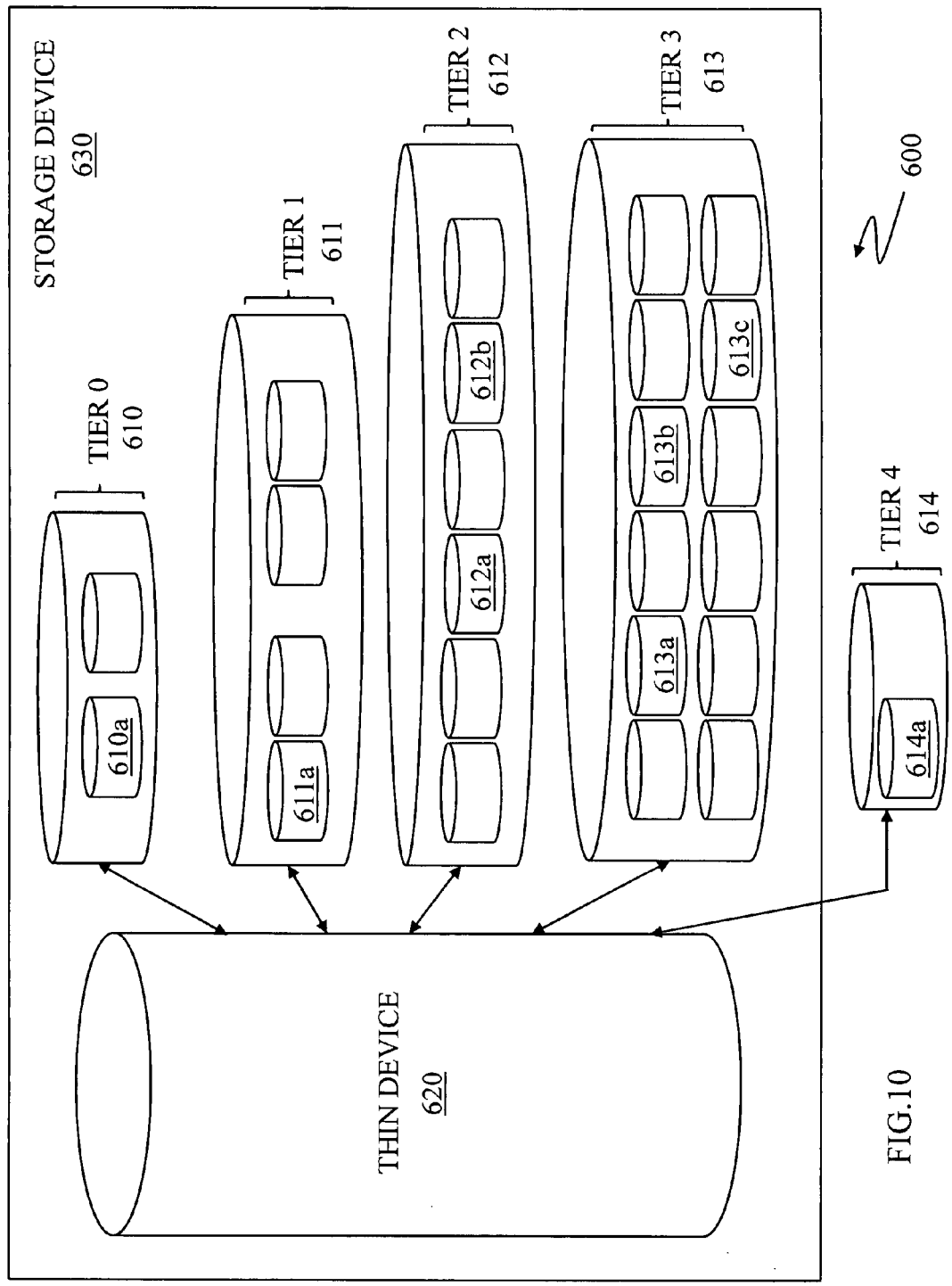
FIG. 10 is a schematic illustration of a fine grained tiered storage system according to an embodiment of the system described herein.

FIG. 10 is a schematic illustration of a fine grained tiered storage system 600 according to an embodiment of the system described herein. A storage device 630 is shown including a thin device 620, like the thin devices 71-74 discussed elsewhere herein, that may be coupled to multiple physical storage devices across multiple storage tiers. As discussed elsewhere herein, the storage tiers may be associated with data devices, like the data devices 61-67 discussed herein, so that, for example, there is one data device for each storage tier, one data device for multiple storage tiers, any portion of a data device for any portion of the pools of storage shown for the storage tiers, and/or any combinations thereof. For example, in an embodiment, a top tier storage pool 610 (e.g., tier 0) may include flash/solid state disk (SSD) drives that are relatively fast and expensive. Other storage pools 611-613 (e.g., tiers 1-3) may include disk drives of decreasing speeds or other configurations (i.e., 15k rpm, 10k rpm, 7.5k rpm redundant array of independent disk (RAID) storage). The lowest tier of storage pool 614 (e.g., tier 4) may include, for example, tape storage, largest capacity disk drives (such as massive array of idle disks (MAID) storage). As illustrated, the last storage tier 614 may include storage devices external to the storage device 630 that may be suitable for long term storage of data that is infrequently accessed. However, note that external storage could have specific characteristics such as tape, or might perform additional processing to optimize the storage of data, such as de-duplication. In some embodiments, external storage might be used to support tier 2 or tier 3 class applications.

The thin device 620 may map to different storage areas (devices) across multiple tiers. As discussed herein, the granularity of the system described herein may be less than at the file level and allow for blocks of data of any size to be stored across multiple storage tiers 610-613 of the storage device 630 in a process that is transparent to the host and/or host application. For example, in the illustrated embodiment, the thin device 620 may map blocks of data to storage areas (devices) such as a storage area 610a in the pool of storage of the top storage tier 610, a storage area 611a in the pool of storage of the next storage tier 611, storage areas 612a, 612b in pool of storage of the next storage tier 612, and storage areas 613a, 613b, 613c in the pool of storage of the next storage tier 613. As discussed elsewhere herein, the last storage tier 614 may include external storage and the system described herein may map to a storage area 614a in the pool of storage in the tier 614.

At least one storage tier (e.g., the lowest storage tier 614) may include redundant data elimination (RDE)/de-duplication storage. RDE/de-duplication technology involves identifying multiple instances of data and storing only a single instances of that data (e.g., files, blocks, chunks, tracks, etc.) thereby eliminating redundant storage of the same data. RDE/de-duplication technologies may be particularly applicable for data that is accessed and/or changed infrequently. For example, RDE/de-duplication may be applied only for data blocks that have not been modified in a particular number of hours, days etc., and/or may be applied in conjunction with a new write and/or other I/O action, as further discussed elsewhere herein. Further, the system may include processing to separate data blocks, files etc. that have been de-duped in the case where the data is no longer suitable for RDE/de-duplication. For example, parts of two separate data files may initially be redundant and subjected to RDE to reduce storage space usage; however, if a write is subsequently requested for only one of the initially redundant data files, then the initially redundant data files may require separate processing and no longer be appropriate for RDE. RDE/de-duplication may allow fewer physical data blocks to support reads from multiple different users, applications, hosts etc. RDE/de-duplication is described in more detail elsewhere herein in accordance with embodiments of the system described herein. Reference is also made to U.S. Pat. No. 6,704,730 to Moulton, et al., which is incorporated by reference herein, which discloses systems for eliminating or screening redundant copies of aggregate blocks of data.

Mirroring (backup) of data may also be facilitated by tiered storage across multiple tiers according to the system described herein. For example, data that is accessed frequently may be stored on a fast storage device (tier 0) while a mirrored copy of the data that is not expected to be accessed may be stored on a slower storage device in one or more other tiers (e.g., tiers 1-4). Accordingly, the same data may be stored on storage devices of multiple tiers of storage pools.

Figure 11:
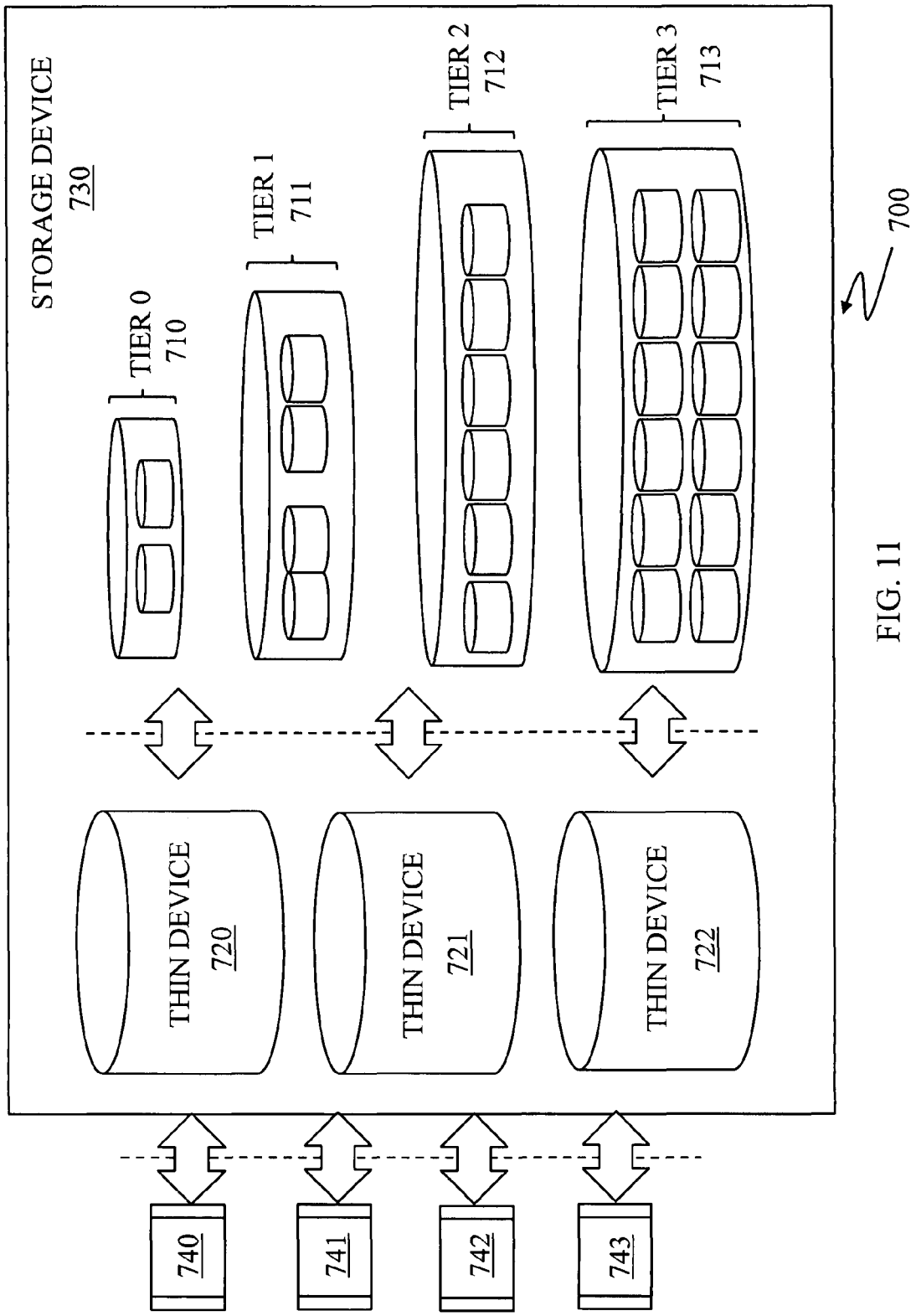
FIG. 11 is a schematic illustration showing a fine grained tiered storage system according to an embodiment of the system described herein.

FIG. 11 is a schematic illustration showing a fine grained tiered storage system 700 according to an embodiment of the system described herein. As illustrated, a storage device 730 includes multiple thin devices 720-722 and multiple pools of storage in multiple storage tiers 710-713. Host applications 740-744 and/or other entities (e.g., other storage devices, SAN switches, etc.) request data writes and data reads to and from the storage device 730. In various embodiments, multiple host applications 740-744 may share a single one of thin devices 720-722 and/or multiple thin devices 720-722 may be mapped to the same set of storage pools 710-713.

In an embodiment herein, a write target policy may be applied to data that is being written according to the system described herein. For example, data that is expected to be used frequently, for example database indices, may be initially written directly to fast storage (e.g., tier 0 flash/SSD storage) whereas data that is not expected to be accessed frequently, for example backup or archived data, may be initially written to slower storage devices (e.g., tier 4 MAID or external storage). In this manner, data is efficiently stored by targeting the write to storage areas and devices according to the estimated or expected access frequency of the data, beginning with the initial write of the data and also applying to subsequent data writes that jump across multiple tiers.

The process for determining the appropriate target storage location of the write of the data may be made based on the logical unit number (LUN) ID of the device from which the data is being written, where the storage device 730 may have or obtain information about the types of data stored on specific logical units. Alternatively, additional policies and capabilities may be enabled by adding host-resident "extension" software, for example to tag I/O requests with information about the requesting application or user so that the determination may be made based on other information provided by the host and/or entity accessing the storage device 730 (e.g., a target policy indicator provided with each write or class of writes). Other possible criteria include the time of day, the size of the incoming write operation (e.g. very large sequential writes vs. smaller random writes), file name, file type, host OS type, data type, access patterns, inter-dependent accesses to other data, etc. It is also possible that "hints" from the host could also be used, particularly relating to performance and availability requirements of the data, etc.

The system described herein may include autonomic promotion and demotion policies to facilitate optimization of performance, storage availability and power. For example, a least recently used (LRU) policy may be used to demote data blocks in order to pro-actively make room for new writes of data blocks and/or promotions of data blocks within the system. A most frequently used (MRU) policy may be used to promote data blocks that are frequently used to faster storage tiers. Predictive policies may be used to recognize that data blocks that will be needed before they are actually needed and promote the data blocks accordingly (for example, nightly batch jobs, etc.). Alternatively, the system described herein may include an application programming interface (API) that allows a hosts/users/applications to inform the storage that certain blocks should be promoted or demoted to different tiers.

Other special purpose policies may also be used. As discussed elsewhere herein, mirroring of data blocks across multiple tiers may be used. For example, for frequently used data blocks, one copy may be written to flash/SSD memory at a top storage tier and a second copy mirrored to another storage tier (e.g., tier 3 or tier 4). Another policy may include promoting and/or demoting a data block, but not deleting the data block from its pre-promoted or demoted location until the data block is modified. This policy offers advantages including when subsequently demoting the block (if unmodified), a copy may already exist on a slower storage tier and an additional copy does not need to be made (only the copy on the faster storage tier deleted). When a data block is modified, the previous copy on a different storage tier may be deleted.

Other policies may include manual or automatic pre-promotion and post-demotion policies. For example, blocks may be promoted in the background immediately before batch runs (e.g., billing runs etc.). Additionally, writes, for such processes as back-ups, may required the fastest possible write, but never (or only infrequently) read. In this case, writes may be written to a top storage tier and immediately scheduled for demotion to a lower storage tier. With MAID storage, data blocks rarely or never used may be consolidated onto individual spindles that may then be powered off, providing a reduction in power consumption for storage of data blocks infrequently accessed. Further, sequential/contiguous blocks may be coalesced and relocated in an optimization process that may include other advanced strategies, including aligning indices near to data being indexed. It is also possible to have a de-duplication policy in which nothing is deleted from storage in a de-dup tier. Data blocks in storage pools of a de-dup storage tier may be promoted to fast storage tiers as needed, but block and index/metadata in the de-dup storage may be maintained even if a data block is promoted to a faster storage tier and modified or deleted. Maintenance of de-dup storage tiers may involve "use counters" and/other mechanisms that may be used with known data cleaning processes such as garbage collection, etc.

Figure 12:
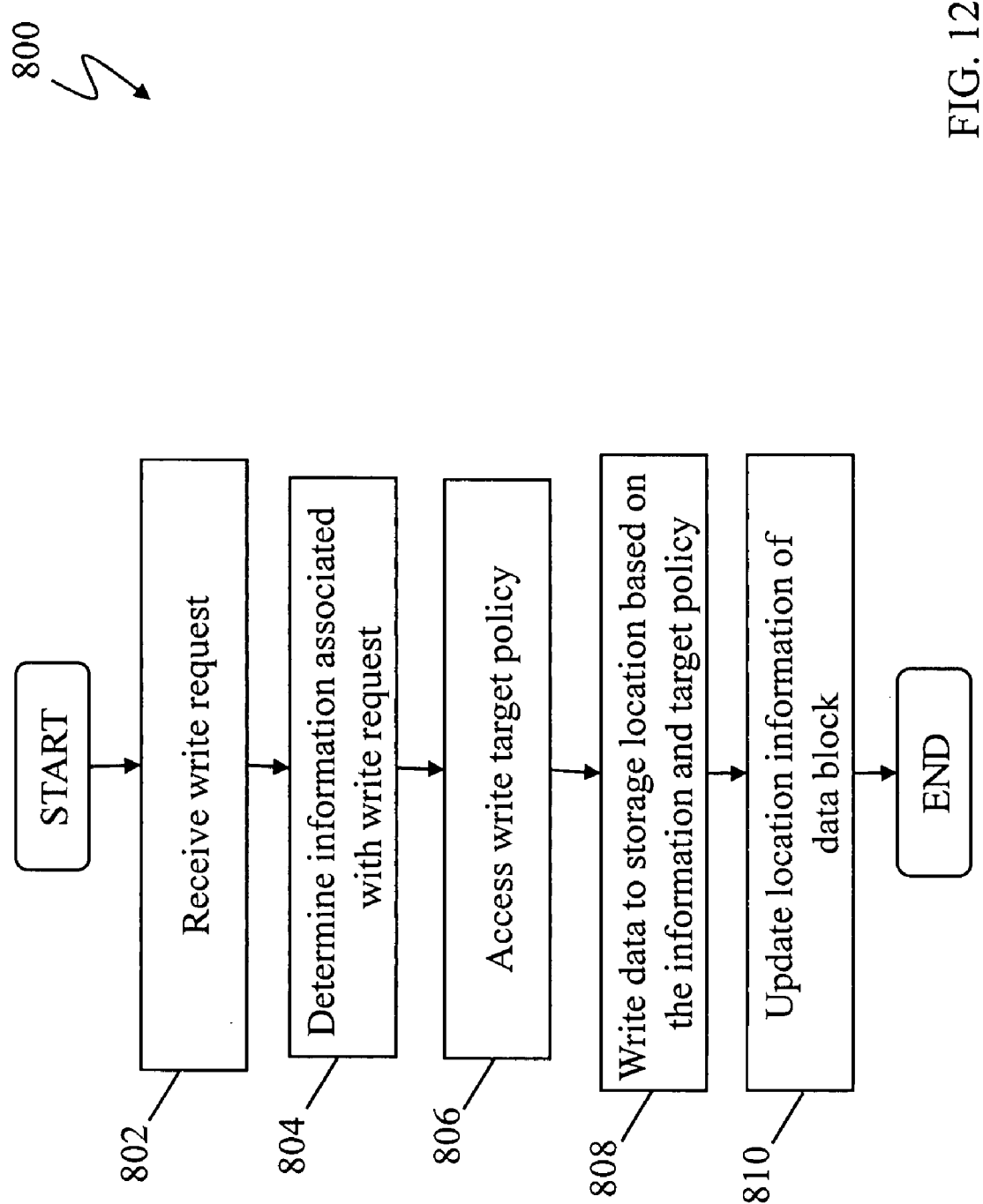
FIG. 12 is a flow diagram of processes for writing data blocks in a fine grained tiered storage system based on one or more policies according to an embodiment of the system described herein.

FIG. 12 is a flow diagram 800 of processes for writing data blocks in a fine grained tiered storage system based on one or more policies according to an embodiment of the system described herein. At a step 802, a request for a write of data is received by a thin device or other logical device associated with a storage device, as described herein. After the step 802, processing proceeds to a step 804 where information associated with the data block is determined. For example, as further discussed elsewhere herein, the information may be the logical unit number (LUN) ID of the device from which the data is being written and/or may other information provided by the host and/or other entity accessing the storage device. After the step 804, processing proceeds to a step 806 where a write target policy is accessed. For example, as further discussed elsewhere herein, the write target policy may specify that data that is expected to be used frequently may be initially written directly to faster storage in a first storage tier whereas data that is not expected to be accessed frequently may be initially written to slower storage devices in a lower storage tier.

After the step 806, processing proceeds to a step 808 where the determined information associated with the data is processed according to the target policy and the data block is written to a storage location in the storage device according thereto. Accordingly, the data block may initially be written to a storage area (device) in a pool of storage of a storage tier corresponding to the anticipated frequency of use of the data block and/or according to other criteria. After the step 808, processing proceeds to a step 810 where information concerning the location of the data block is updated in a table of information in the thin device, as further discussed elsewhere herein. After the step 810, processing is complete.

In some cases, there may be insufficient available free space to write data to the storage tier corresponding to the storage policy at the step 808. This may be addressed in a number of ways. One possibility is to maintain the data in cache memory until space becomes available, which can occur when data is moved from the target tier as a result deletion of promotion/demotion based on storage policies. Note also that it is possible to temporarily store the data in a lower tier, and then schedule the data for promotion to the appropriate tier using any appropriate mechanism, such as setting a flag that causes the data to be promoted before any other data.

Figure 13:
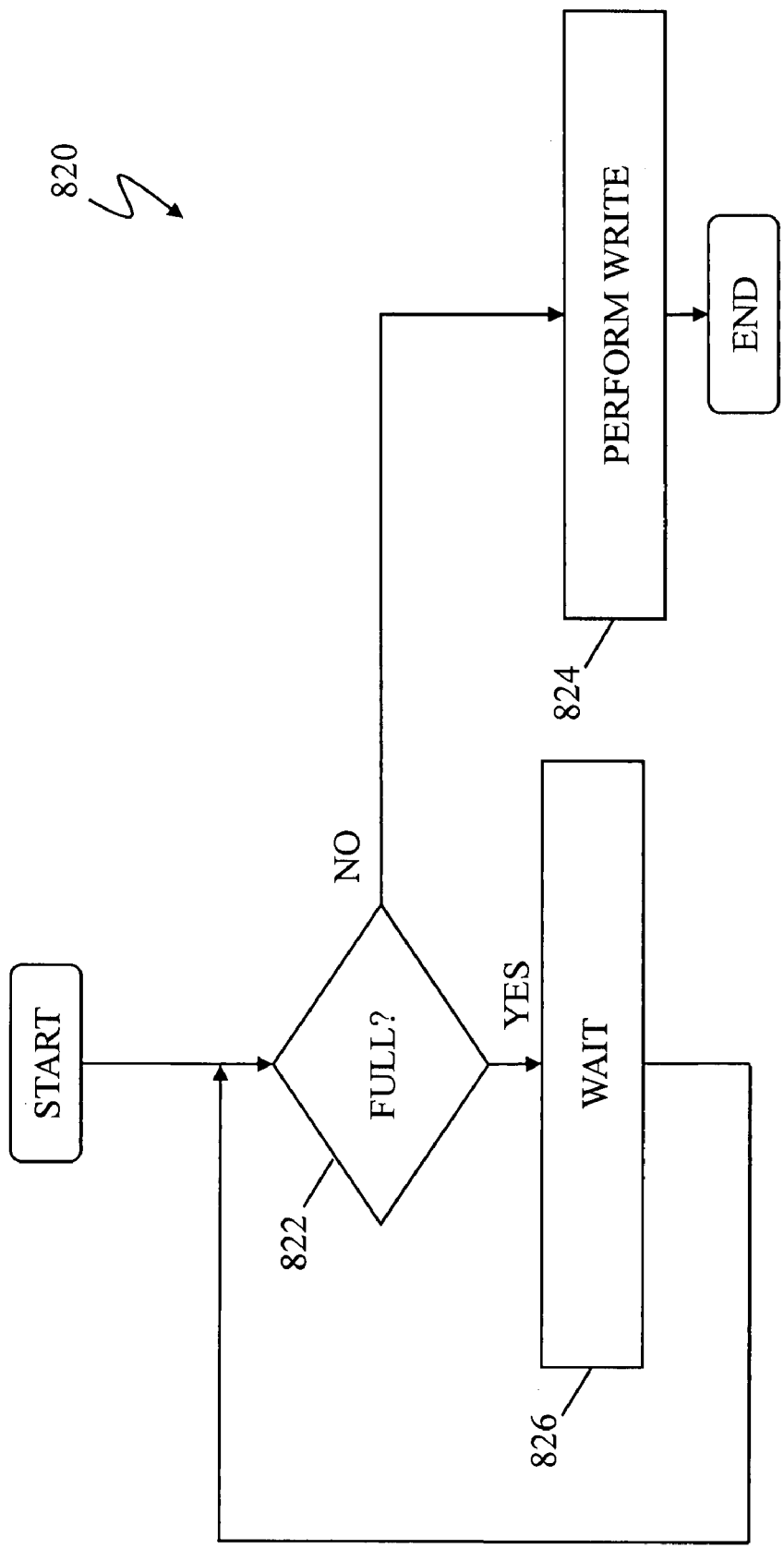
FIG. 13 is a flow diagram of processes for writing data to a particular tier according to an embodiment of the system described herein.

FIG. 13 is a flow diagram 820 illustrating steps performed in connection with writing data to a storage tier that may be full. Processing begins in the first test step 822 where it is determined if the storage tier is full. If not, then control passes from the test step 822 to a step 824 where the data is written to the storage tier. Following the step 824, processing is complete.

If it is determined at the test step 822 that the storage tier is full, then control passes from the test step 822 to a step 826 where wait processing is performed. The wait at the step 826 could be for any appropriate amount of time. Following the step 826, control passes back to the test step 822 for a new iteration.

Figure 14:
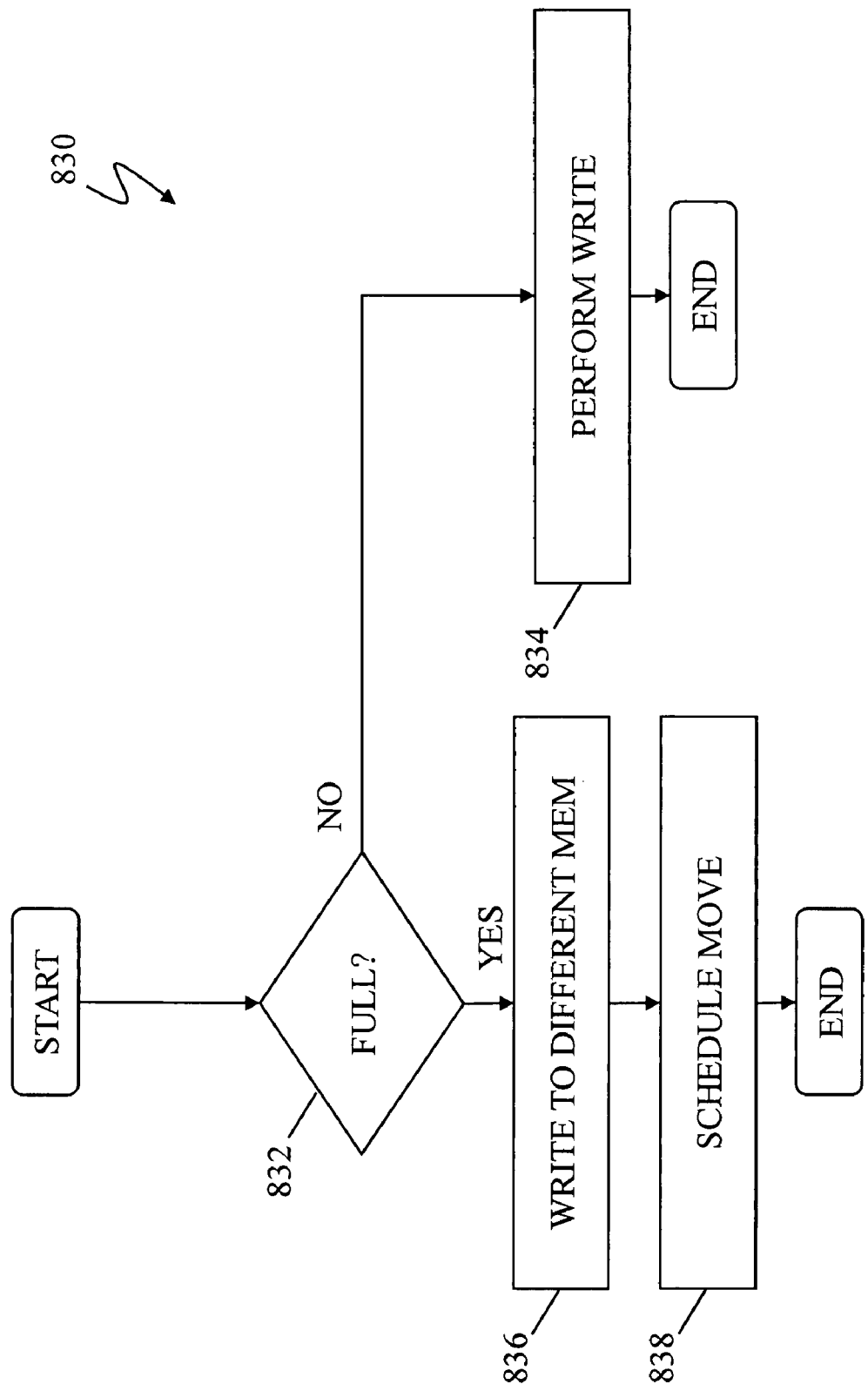
FIG. 14 is a flow diagram of processes for writing data to a particular tier according to an alternative embodiment of the system described herein.

FIG. 14 is a flow diagram 830 that illustrates an alternative embodiment for handling write operations to a storage tier that may be full. Processing begins at a first test step 832 where it is determined if the storage tier is full. If not, then control passes from the test step 832 to a step 834 where the data is written to the storage tier. Following the step 834, processing is complete.

If it is determined at the test step 832 that the storage tier is full, then control passes from the test step 832 to a step 836 where the data is written to a different storage area, such as a lower (or higher) storage tier or to global memory of the storage device (e.g., cache memory), as further discussed herein. The data may be placed in the different storage area temporarily. Following the step 836 is a step 838 where the data is scheduled to be moved to the appropriate storage area (the originally-destined storage tier). Following the step 838, processing is complete.

In an embodiment, at the step 836, the write data may be temporarily stored in a global memory, such as the global memory 46, until memory in the particular requested tier becomes available that is sufficient to handle the write request. At the step 838, scheduling for the movement of the data may include relocating data in the particular requested tier, e.g. "faster" storage tier, to a lower tier, e.g. "slower" storage tier, to make memory available for the data temporarily stored in the global memory. In another embodiment, at the step 836, data for the requested write may be immediately written to a lower tier than that requested for the write and, at the step 838, a future promotion of the data to the particular requested higher tier (originally-destined storage tier) may be scheduled. The embodiments discussed herein provide for the dynamic re-allocation and re-ordering of data to accommodate write policies, usage patterns and the like.

Figure 15:
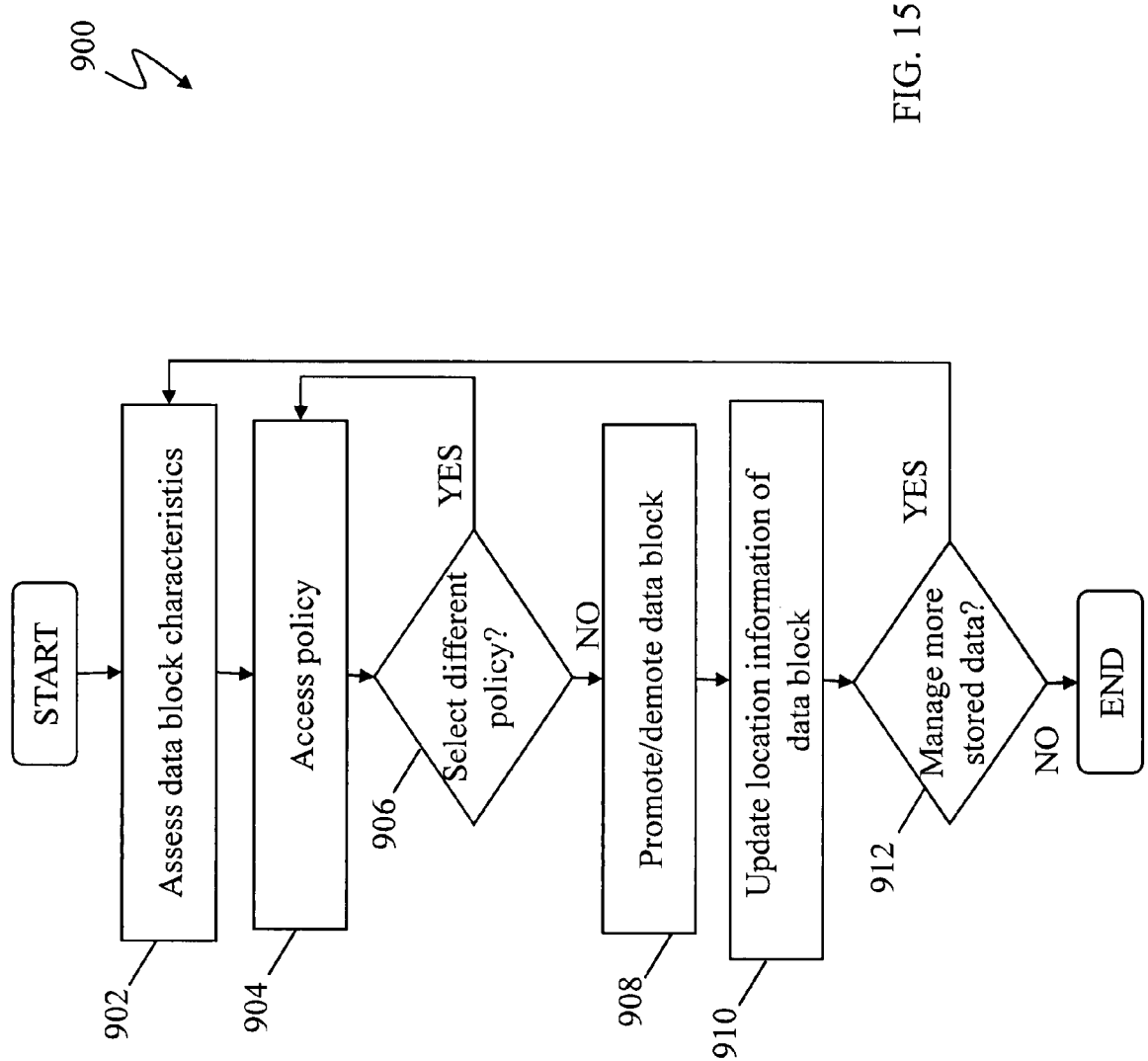
FIG. 15 is a flow diagram of processes for promoting and demoting data blocks in a fine grained tiered storage system according to an embodiment of the system described herein.

FIG. 15 is a flow diagram 900 of processes for promoting and demoting data blocks in a fine grained tiered storage system according to an embodiment of the system described herein. At a step 902, characteristics of a data block are assessed or otherwise determined. As further discussed elsewhere herein, characteristics may include access frequency of the data block, time of last access or use, information associated with particular users of the data block and/or other characteristics and statistics information. The characteristics may be assessed periodically, at a determined time, after the occurrence of a trigger event and/or based on some other criteria. After the step 902, processing proceeds to a step 904 where a policy is accessed related to promotion and/or demotion of data blocks between multiple storage tiers. Policies may be accessed automatically or manually as discussed elsewhere herein and include such policies as LRU, MFU, predictive policies and/or special purpose policies. After the step 904, processing proceeds to a test step 906 where it is determined if a different policy is to be selected. In some instances, it may be useful to be able to dynamically select the policy to be used based on characteristics of the data and/or some other criteria, such as dynamic run time conditions. For example, a first policy may be used for tier 4 data that was recently moved from tier 3 while a second policy may be used for tier 4 data that has been tier 4 data for a relatively long period of time. If a different policy is to be selected, processing proceeds back to the step 904. Otherwise, processing proceeds to a step 908.

At the step 908, data blocks are to be promoted and/or demoted according to the one or more policies. If a data block is promoted, the data block is moved to a storage area (device) in a pool of storage of a higher storage tier, for example faster storage. If a data block is to be demoted, the data block is moved to a storage area (device) in a pool of storage of a lower storage tier, for example slower storage. As further discussed elsewhere herein, in some cases, the promotion and/or demotion procedure may include moving copies of data blocks to other storage tiers and the deleting the old data blocks from their original storage location and/or copies of data blocks previously stored at the subsequent storage tiers may be used and "movement" of the data block is to make the previously-stored version of the data block become again the current, accessible data block.

After the step 908, processing proceeds to a step 910 where information concerning the location of the data block is updated in a table of information in the thin device, as further discussed elsewhere herein. After the step 910, processing proceeds to a test step 912 where it is determined whether additional stored data is to be managed according to the system described herein. If more stored data is to be managed (promoted/demoted), processing proceeds back to the step 902. Otherwise, processing is complete.

As described elsewhere herein, it may be appropriate to store data blocks in multiple locations and/or on multiple different tiers in order to implement and maintain the performance or availability policies. For example, should a policy determine that a particular block should be moved to a MAID tier, where drives are powered down for lengthy periods, a copy may also be kept on otherwise unused space in a higher tier. Should a request arrive for the block, it could thus be serviced from the copy in the higher tier instead of requiring to power up the MAID storage device. In such situations, the secondary copy might be identified as expendable. In the event a new write arrives that requires space utilized by the secondary "expendable" block, it could be overwritten with the new data and the appropriate information regarding the location of the old and new blocks updated appropriately. Further, such "expendable" blocks could be deleted on other trigger events or on a timer-based schedule.

The system described herein may be used in conjunction with garbage collection processing for memory management. For example, for data blocks that are being kept in two separate tiers, either temporarily or for longevity, it may be desirable to delete one copy to make room for more new data (e.g., when a tier is nearly full or when the pool itself is getting full). As further discussed herein, one or more lists of potential "delete" candidates may be maintained and garbage collection then becomes a process of traversing the one or more delete lists and removing redundant copies according to policy (e.g. keep the fastest, keep the slowest/cheapest, base decision on which one more recently/frequently utilized/accessed, etc.).

In an embodiment of the system described herein, a list of data sections that may be deleted (delete list) may be maintained as a linked list, such as a singly-linked list or a doubly-linked list, although other known data structures may be used. Candidates for deletion may be inserted and removed from the list using known linked list manipulation techniques or other data structure manipulation techniques. Entries in the delete list may be generated during promotion or demotion processing, as discussed elsewhere herein. For example, a data block may be promoted from a lower tier to a higher tier with the data block being copied to the higher tier and the copy of the data block on the lower tier being added to the delete list. Other techniques for generating entries in the delete list are possible.

Figure 16:
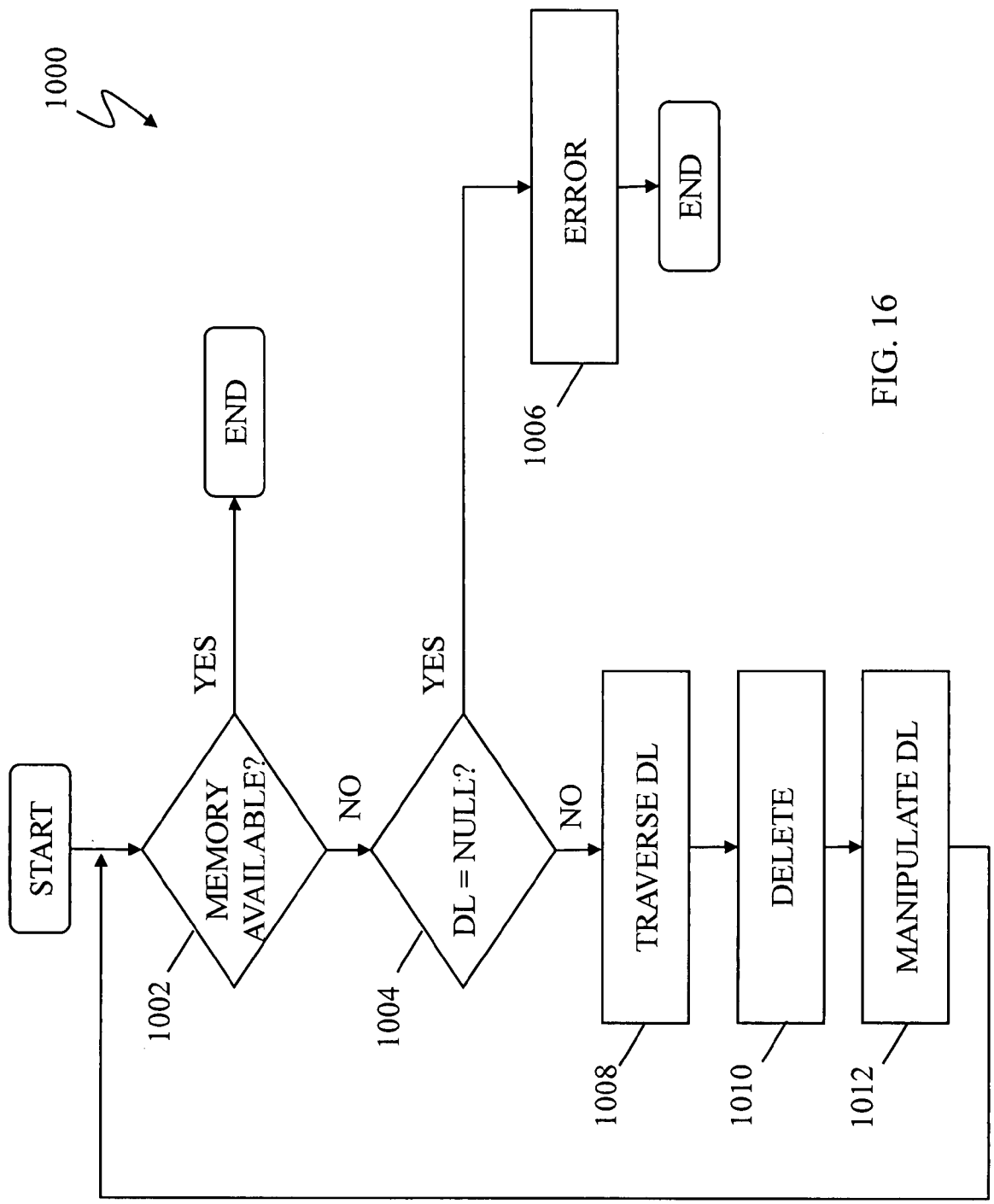
FIG. 16 is a flow diagram illustrating garbage collection processing for memory management according to an embodiment of the system described herein.

FIG. 16 is a flow diagram 1000 illustrating garbage collection processing for memory management according to an embodiment of the system described herein. At a test step 1002, it is determined whether there is sufficient memory available for a write request, for example, to a particular storage tier. If there is sufficient memory available then garbage collection is not required and processing is complete. If there is not sufficient memory available for the write request, then processing proceeds to a test step 1004 where it is determined if a delete list (DL), maintained for garbage collection as discussed herein, indicates that there are data block candidates for deletion from memory. If there are no entries in the delete list, i.e. no data block candidates for deletion from memory and the delete list is null, then processing proceeds to a step 1006 where an error is returned indicating that memory is not available for the write request. After the step 1006, processing is complete.

If the delete list contains entries indicating that there are data block candidates for deletion, then processing proceeds to step 1008 where the delete list is traversed to select a data block candidate for garbage collection, i.e. deletion. The delete list may be configured as appropriate, such as with the oldest data block candidate for deletion at the head of the linked list and the most recent data block candidate for deletion at the end. Other traversal configurations may also be used. Accordingly, for a delete list configured as noted above, the head of the list containing the oldest data block candidate for deletion may be selected for garbage collection. After the step 1008, processing may proceed to a step 1010 at which the selected data block candidate is deleted or otherwise marked for deletion. After the step 1010, processing proceeds to a step 1012 where the delete list is updated, for example using appropriate linked list manipulation techniques. After the step 1012, processing may proceed back to the test step 1002 to determine whether there is sufficient memory now available for the write request.

In various embodiments, the system described herein may allow for restore capabilities for data block candidates on the delete list. Although such data block candidates may no longer be written to, the data block candidates marked for deletion, as discussed herein, may still be read to provide restore capability of older data. The system described herein may also include processing to monitor when data block candidates on the delete list are no longer redundant copies of data. For example, data may be initially maintained as a redundant copy of data promoted to a different storage tier, but become outdated if the promoted data is changed by additional writes. In this instance, the older version of the data may be moved to the top of the delete list and/or immediately marked for deletion. The system described herein may allow for splitting of data blocks for garbage collection that includes splitting portions of files, datasets and/or databases, as further discussed elsewhere herein.

According to another embodiment of the system described herein, data de-duplication (or redundant data elimination (RDE)) may be used to reduce the amount of actual storage space consumed by a device and/or the amount of data copied locally inside a storage device and/or the amount of data sent over a link if a device is protected by a remote storage system, such as an RDF product by EMC Corporation of Hopkinton, Mass.

A data de-duplication algorithm may detect duplicate data on a chunk by chunk basis, where a chunk may represent a plurality of bytes, tracks, sections, etc. of data. In an embodiment, duplicate data may be detected as it is written to a thin device; however, other detection processes may be used including periodic duplicate data detection that is performed as a background process. The data de-duplication algorithm may use a Cyclical Redundancy Check (CRC) signature, and/or other high reliability signature, that is calculated and updated for a data chunk to detect instances of duplicate data. Examples of algorithms for detecting data duplication, including the use of hashing, are described in U.S. Pat. No. 6,704,730 to Moulton, et al., which is incorporated by reference herein. If data of a write request is found to be a duplicate of an already existing chunk, no new storage space is allocated when the write request is made to the thin device. Instead, the thin device may be configured to point to the data device that contains the already-existing copy of the data. In an embodiment, a reference counter may be maintained on the data device, for example as part of a data structure used in connection with a data device chunk, indicating that the particular data chunk has more than one owner, including multiple thin chunks on one thin device and/or multiple thin chunks among multiple thin devices, as further discussed elsewhere herein. In another embodiment, a reference counter may be maintained on a thin device that indicates other of the thin devices may be linked to this thin device concerning ownership of a particular data chunk, as further discussed elsewhere herein. In this way, the system described herein provides for date duplication with data owners within one thin device and/or with data owners across multiple thin devices. Note that any other appropriate technique for detecting duplicate data be used, including, for example, byte-by-byte comparison.

Figure 17A:
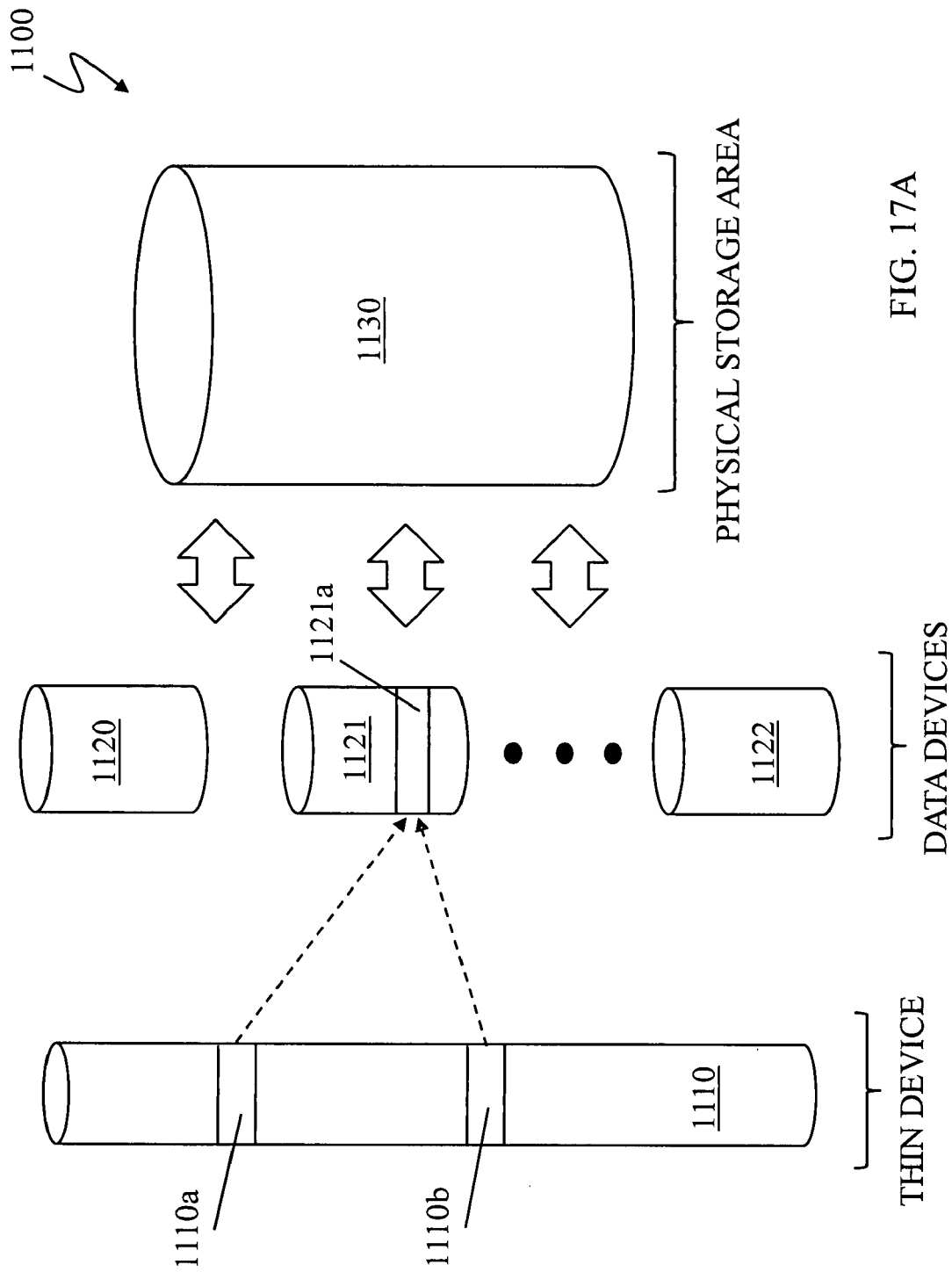
FIG. 17A is a schematic illustration of a storage device using de-duplication processing according to an embodiment of the system described herein.

FIG. 17A is a schematic illustration of a storage device 1100 using de-duplication processing according to an embodiment of the system described herein. The storage device 1100 may include a thin device 1110, one or more data devices 1120, 1121, 1122 and a physical storage area 1130 (e.g., one or more physical drives). A thin section or chunk 1110*a* of the thin device 1110 may point to a data chunk 1121*a* of a particular data device 1121 of the data devices 1120-1122. In various embodiments, the data chunk 1121*a* on the data device 1121 may be a portion of a data device and/or may be the entire data device. The size of a chunk may depend on storage space allocation granularity and may represent a trade-off between overhead costs and duplication frequency. For example, the larger the size of a chunk the less overhead is required to maintain the chunks of a data device but the less the likelihood is that the duplicate data chunks may exist which could be de-duplicated to reduce excess storage size. In contrast, the smaller the size of a chunk, the higher the overhead costs to maintain the chunks on a data device but the higher the likelihood is that duplicate data chunks exist which may be de-duplicated. As further discussed elsewhere herein, the thin device 1110 may be a logical volume that maps to locations of data stored on the data devices 1120-1122, also logical volumes, which themselves map to the location of the data on the physical storage area 1130.

When a write request is made to the thin device 1110, a data de-duplication detection algorithm, as discussed elsewhere herein, may be used to detect whether the data of the write request is a duplicate of data already stored on one of the data devices 1120-1122. If it is determined by the data de-duplication detection algorithm that the data of the write request is a duplicate of data already on one of the data devices 1120-1122, for example a data chunk 1121a on the data device 1121 that is pointed to by thin chunk 1110a of the thin device 1110, then, according to the system described herein, the new data may not be written again to one of the data devices 1120-1122. Instead, a new thin chunk 1110b may be configured on the thin device 1110 to also point to the data chunk 1121a.

A reference counter may be included that indicates how many owners there are of a data chunk stored on a data device. An owner of a data chunk on a data device may represent a thin chunk of a thin device pointing to the data chunk. The reference counter may be maintained on a data chunk of the data device. In various embodiments, the reference counter may be included as part of data in the data chunk that the reference counter is maintaining (for example, data chunk 1121a) and/or may be part of a different data chunk. Alternatively, the reference counter may be part of data external to the data devices, for example, as part of data of the thin device. The reference counter may be additional metadata that keeps track of the number of owners and/or users of the data. The size and counting range of the counter may be balanced against the storage space savings. For example, having a byte counter may allow creation of 255 data clones.

Figure 17B:
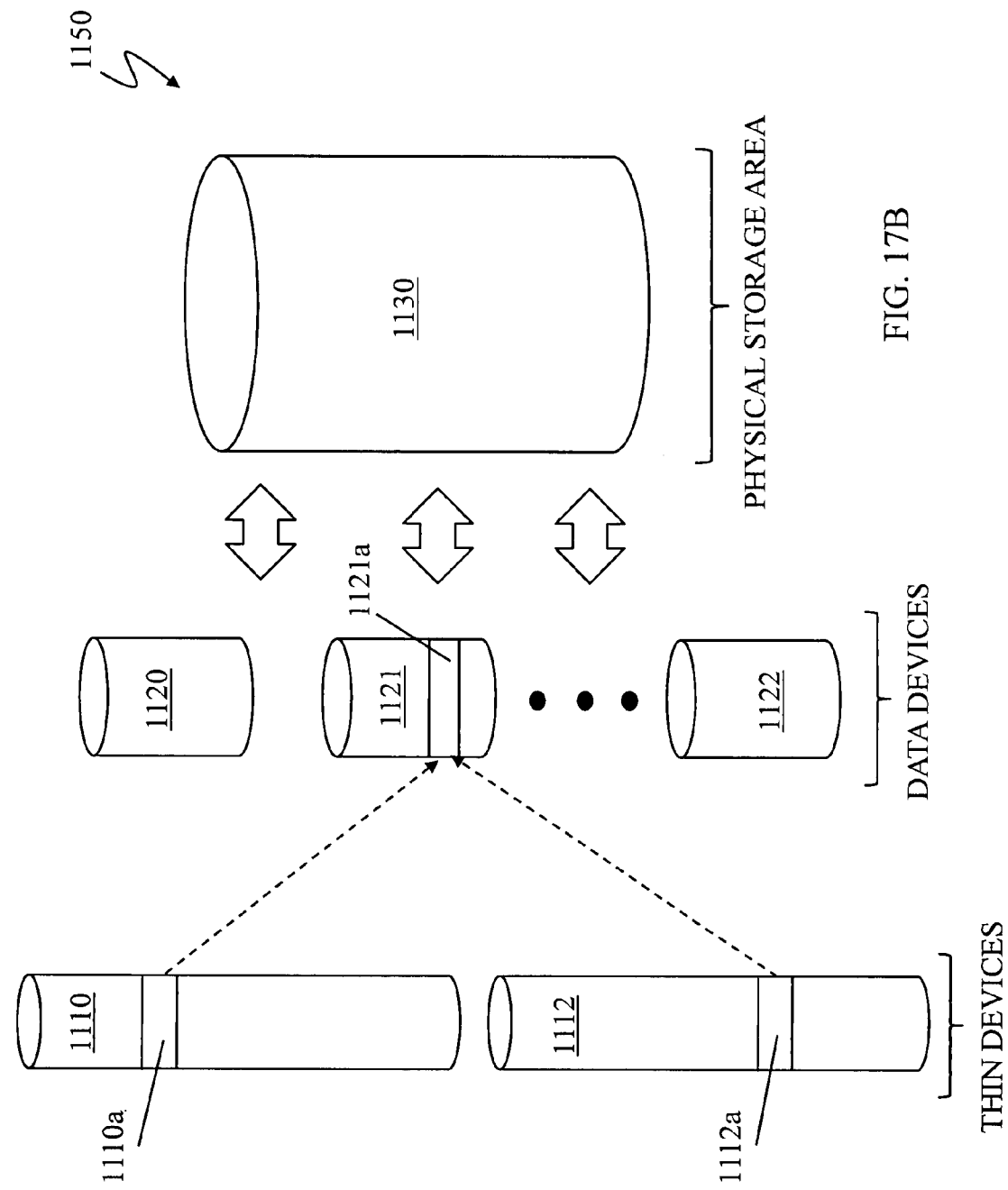
FIG. 17B is a schematic illustration of a storage device using de-duplication processing according to another embodiment of the system described herein.

FIG. 17B is a schematic illustration of a storage device 1150 using de-duplication processing according to another embodiment of the system described herein. The storage device 1150 may be similar to the storage device 1100 except that, as illustrated, data duplication according to the system described herein may take place across multiple thin devices 1110, 1112. As illustrated, the thin chunk 1110a of the thin device 1110 and a thin chunk 1112a of the thin device 1112 may each point to the data chunk 1121a of the data device 1121 that maps to the physical storage area 1130. As further discussed elsewhere herein, a reference counter associated with the data device 1121 may indicate that the data chunk 1121a has the multiple thin chunks 1110a, 1112a as multiple owners of the data chunk 1121a. Any combination of the storage device 1100 and the storage device 1150 may also be used with the system described herein.

Figure 17C:
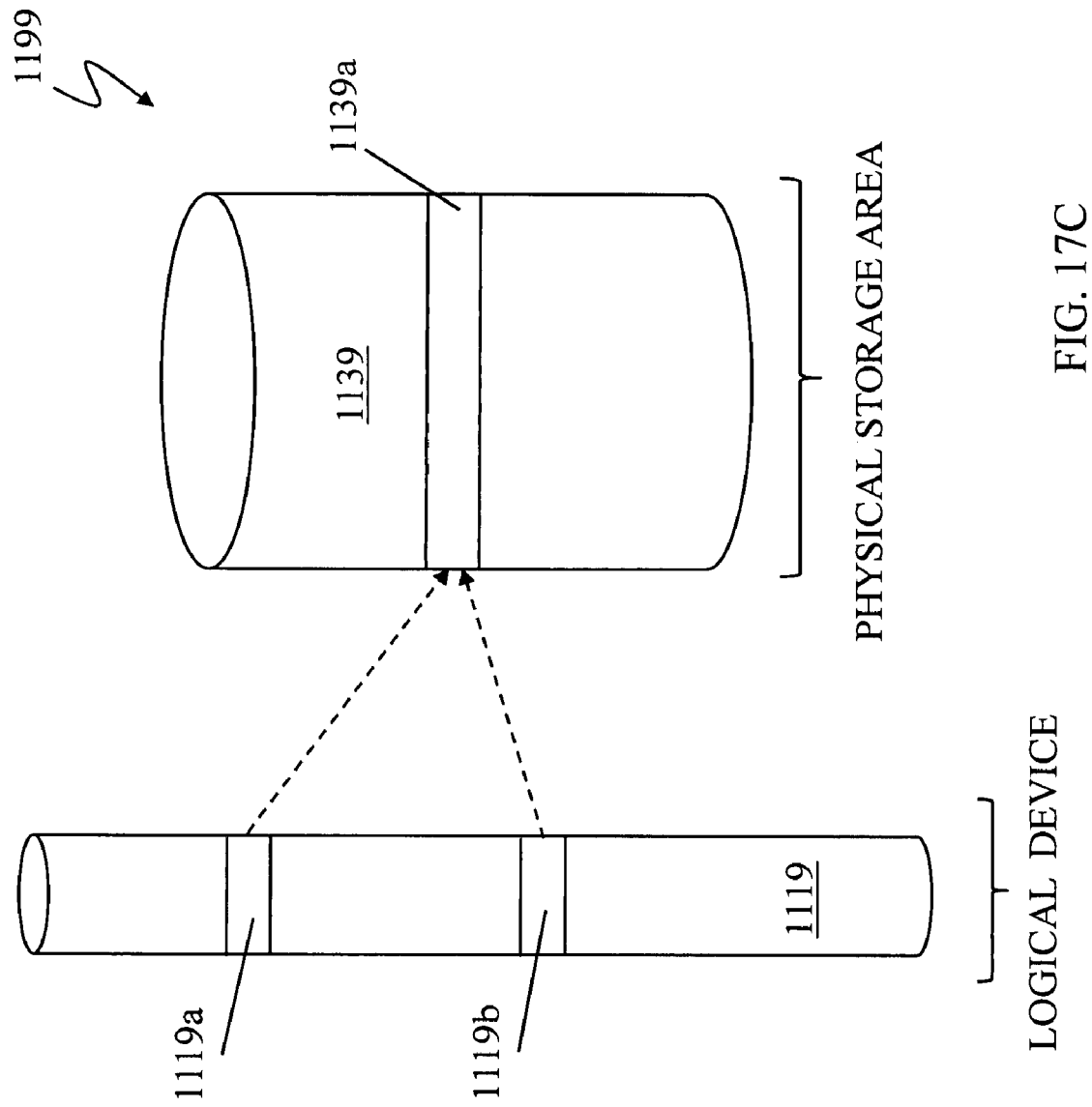
FIG. 17C is a schematic illustration of storage system showing a logical device including logical sections that both point directly to a section of a physical volume.

In other embodiments, the system described herein may operate with only one logical volume that maps to physical storage space on a physical volume. FIG. 17C is a schematic illustration of storage system 1199 showing a logical device 1119 including logical sections 1119a, 1119b that both point directly to a section 1139a of a physical storage area 1139 (e.g., one or more physical drives) and indicate de-duplication of data stored on the section 1139a of the physical storage area 1139. In this embodiment, the logical device 1119 may be similar to the thin device 1110 but which maps directly to the physical volume 1139 without intervening data devices.

Figure 18:
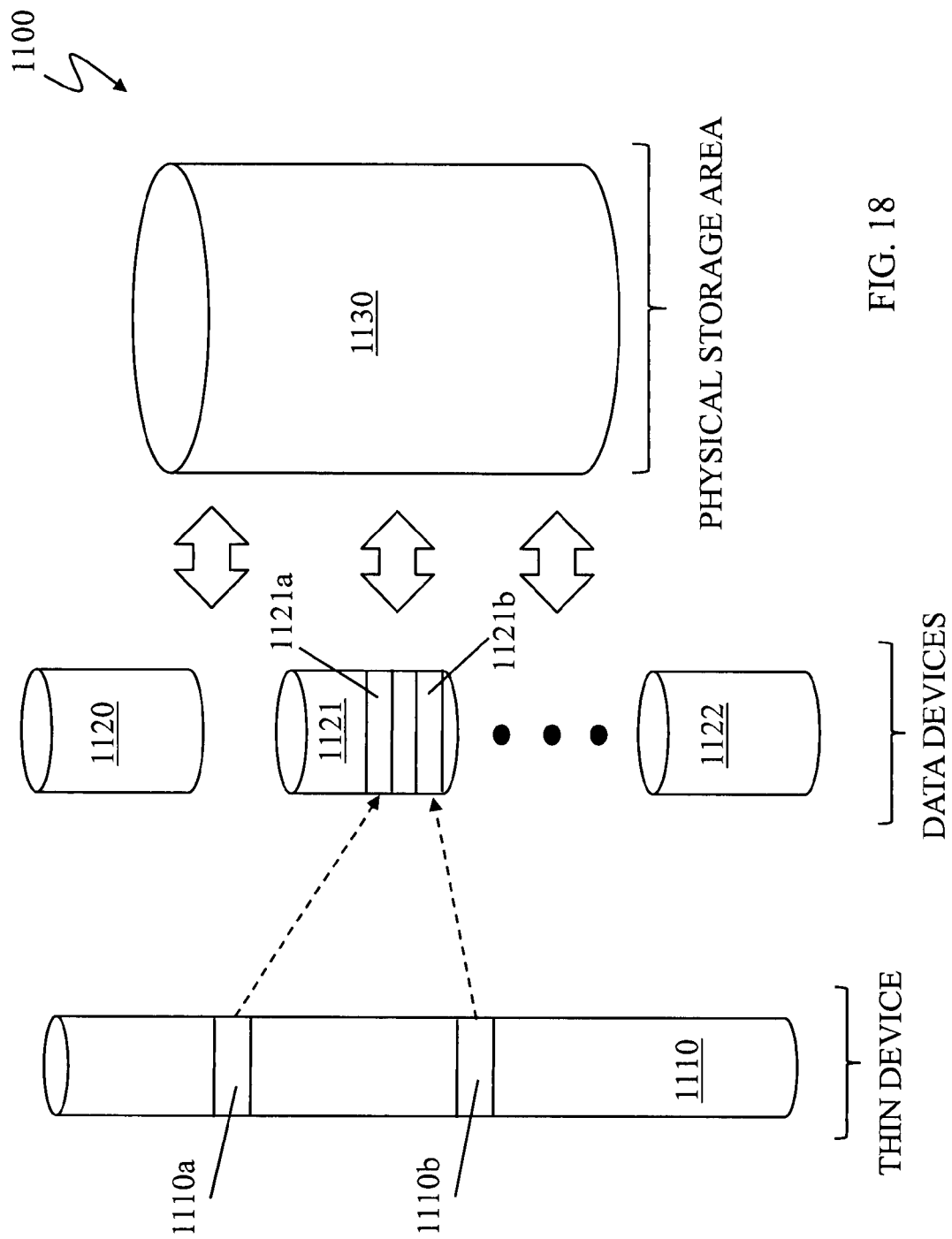
FIG. 18 is a schematic illustration of the storage device showing the state of the device following a host write request that changes a de-duplicated data chunk according to an embodiment of the system described herein.

FIG. 18 is a schematic illustration of the storage device 1100 showing the state of the device following a host write request that changes a de-duplicated data chunk according to an embodiment of the system described herein. For example, the thin chunk 1110a may still correspond to an owner of the original, unchanged information in the data chunk 1121a; however, the host write request may indicate that the owner of the thin chunk 1110b has requested a write to change the data that is currently in the data chunk 1121a. When this happens, the HA may perform an intercept action on the write request and allocate a new data chunk 1121b on the data device 1121 and/or a new data chunk on a different data device, for example the data device 1122, and instruct the DA to perform a copy-and-merge operation of the data to the new data chunk 1121b. The thin chunk 1110b is then modified to point to the new data chunk 1121b, as illustrated. The reference counter for the data chunk 1121a will then be decremented, indicating that the data chunk 1121a has fewer owners. Once a reference counter for a data chunk is decremented down to one, indicating a single owner of a data chunk, then in response to a subsequent write request to change the data chunk, the HA may just overwrite the data chunk without allocating a new data chunk.

Figure 19:
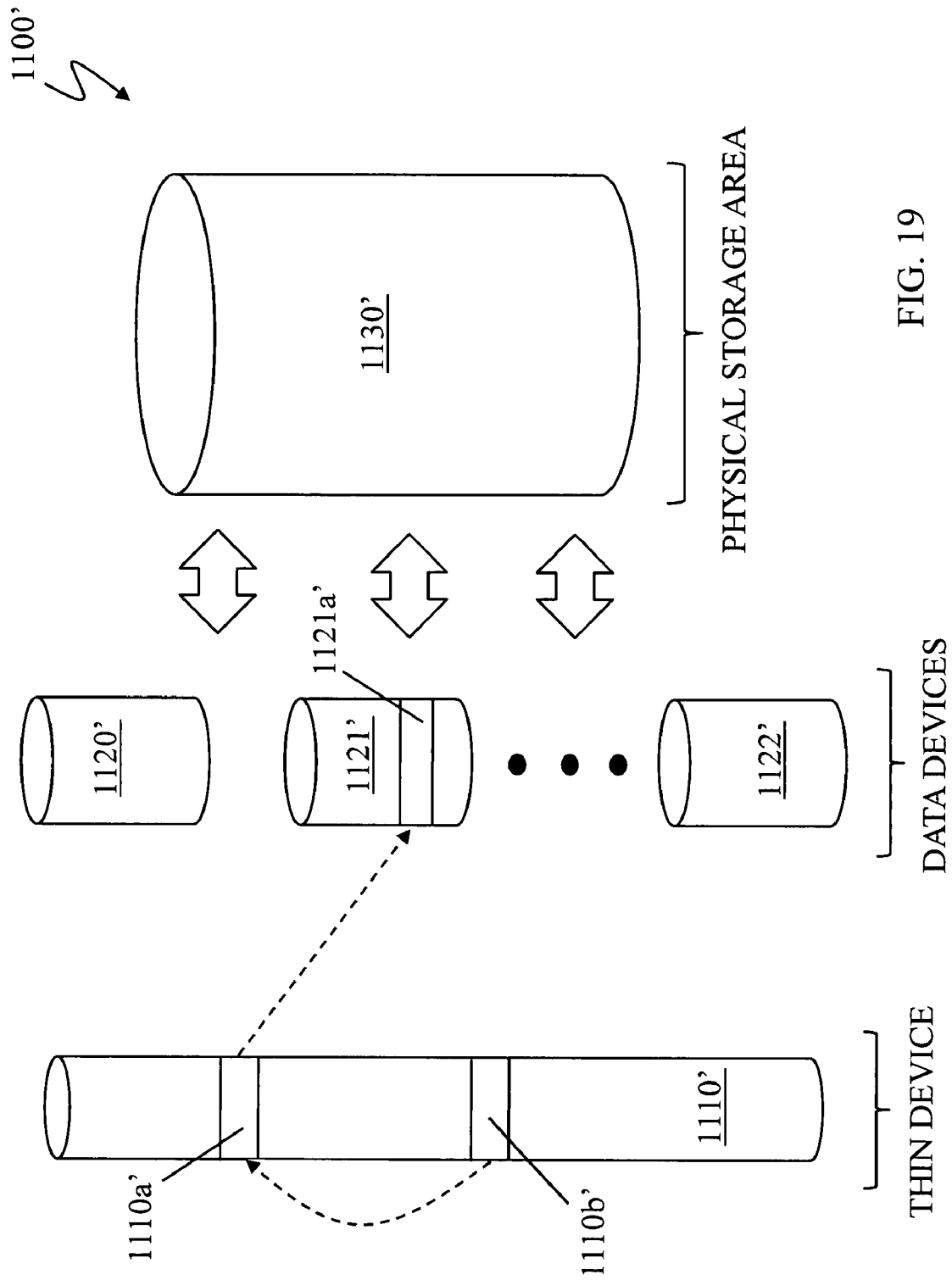
FIG. 19 is a schematic illustration of another embodiment of a storage device using data de-duplication processing according to the system described herein.

FIG. 19 illustrates another embodiment of a storage device 1100' using data de-duplication processing according to the system described herein. The storage device 1100' is similar to the storage device 1100 and includes a thin device 1110', data devices 1120'-1122' and a physical storage area 1130' (e.g., one or more physical disk drives). The storage device 1100' differs from the storage device 1100, however, in that for the case of a write request to the thin device 1110' that is identified as containing duplicate data already on one of the data devices 1120'-1122', for example a data chunk 1121a' on the data device 1121', a new thin chunk 1110b' is configured to point to the thin chunk 1110a' instead of directly to the data chunk 1121a' of the data device 1121'. This may be seen in comparison to, for example, the storage device 1100 in which the thin chunk 1110b points directly to the data chunk 1121a. In the case of configuration of the storage device 1100', in an embodiment, a reference counter may be included in the thin chunk 1110a' indicating another thin chunk 1110b' points to the thin chunk 1110a' to indicate that is another owner of the data stored at data chunk 1121a'. Other embodiments for the reference counter are possible as discussed elsewhere herein. Combinations of the storage devices 1100 and 1100' may also be used in conjunction with the system described herein.

Figure 20:
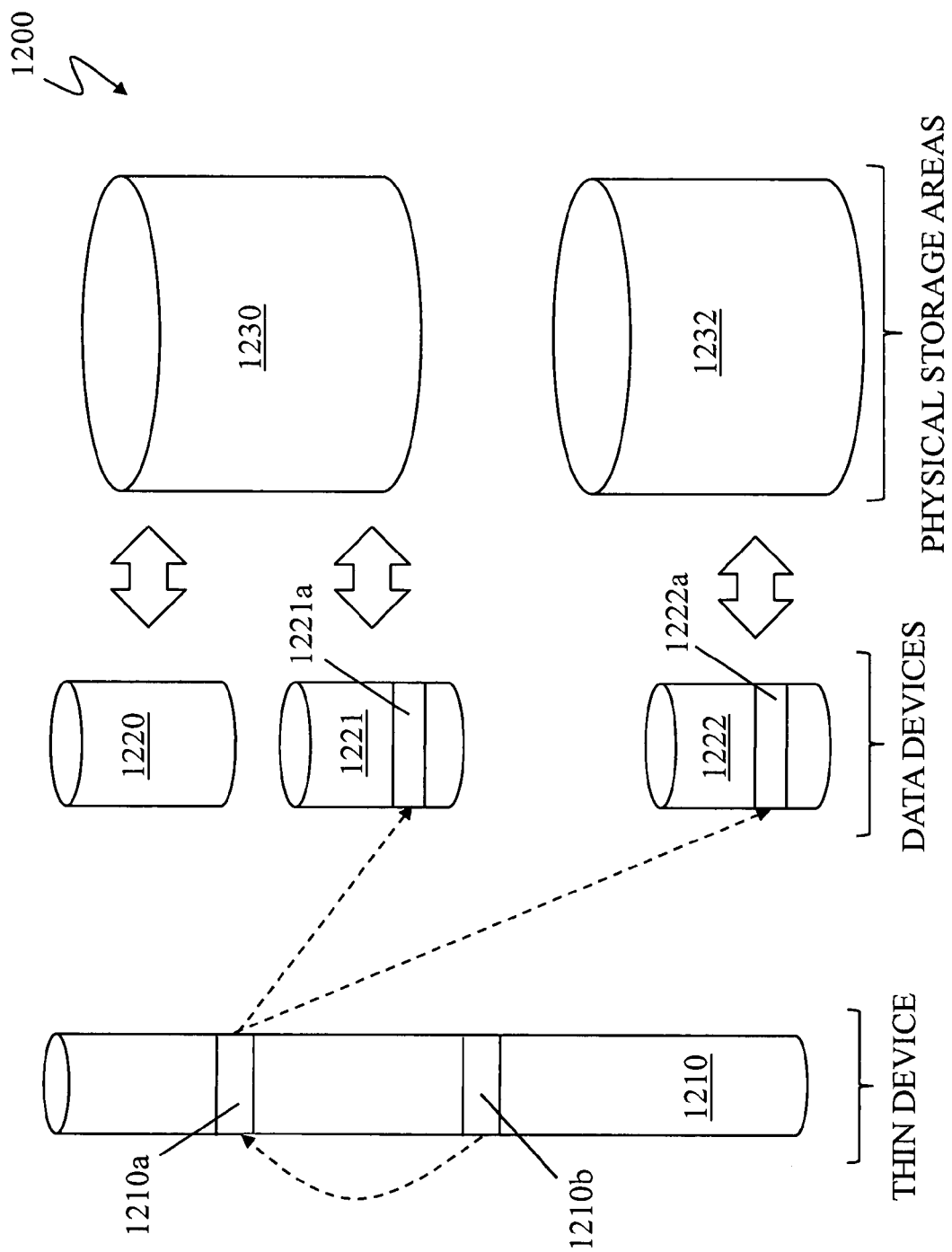
FIG. 20 is an illustration of the storage device showing the state of a storage device following movement of de-duplicated data from one storage tier to a different storage tier according to an embodiment of the system described herein.

FIG. 20 is an illustration showing the state of a storage device 1200 following movement of de-duplicated data from one storage tier to a different storage tier according to an embodiment of the system described herein. The storage device 1200 includes a thin device 1210, data devices 1220, 1221 associated with a physical storage area 1230 (e.g., one or more physical drives) of one storage tier and data device 1222 associated with a physical storage area 1232 (e.g., one or more physical drives) of another storage tier. As further discussed elsewhere herein, data devices may be grouped into pools that correspond to multiple storage tiers of physical storage areas having different characteristics, such as speed. In the illustrated embodiment, data is shown as being mirrored between multiple physical storage areas, but is not unnecessarily duplicated on any one physical storage area. Unnecessary use of physical storage space is avoided by the de-duplication process according to the system described herein, which also improves the use of storage space for systems and processes for mirroring data in order to provide an accessible back-up copy of the data.

In FIG. 20, a thin chunk 1210b points to a thin chunk 1210a and, accordingly, in the event of data being mirrored, or just moved, from one storage tier to another storage tier, the de-duplication process according to the illustrated embodiment of the system described herein allows for only the pointers from the thin chunk 1210a to be modified to point to the data chunk 1221a of the data device 1221 and/or the new data chunk 1222a of the new data device 1222. It should be noted that a storage device like that described herein for the storage device 1100 may also be used with the above-described embodiment; however, for such a storage device, in the event of mirroring or moving data to a data device of a different storage tier, both thin chunks, such as the thin chunks 1110*a* and 1110*b* described herein, would each be modified to point to the new data chunk of the new data device.

The system described herein may also be implemented in a device having RDF protection. An RA may detect the de-duplicated chunks and generate a type of I/O indicating that the chunk is the same as another chunk already transferred. The de-duplication mechanism may be used in conjunction with a local storage device on an RDF copy of data that is sent to a remote storage device, and/or on host I/O data flow and may be beneficial in reducing the amount of duplicate data that is sent via the data link 22 from the local storage device to the remote storage device (see FIGS. 1A and 1B). Additionally, the remote storage device may include also include a de-duplication system as described herein. As further discussed elsewhere herein, de-duplication processes may be performed as writes are made to a storage device and/or as periodic background processes. For example, in the case of an RDF system, de-duplication may be performed in conjunction with daily or nightly synchronization of the local and remote storage devices.

Figure 21:
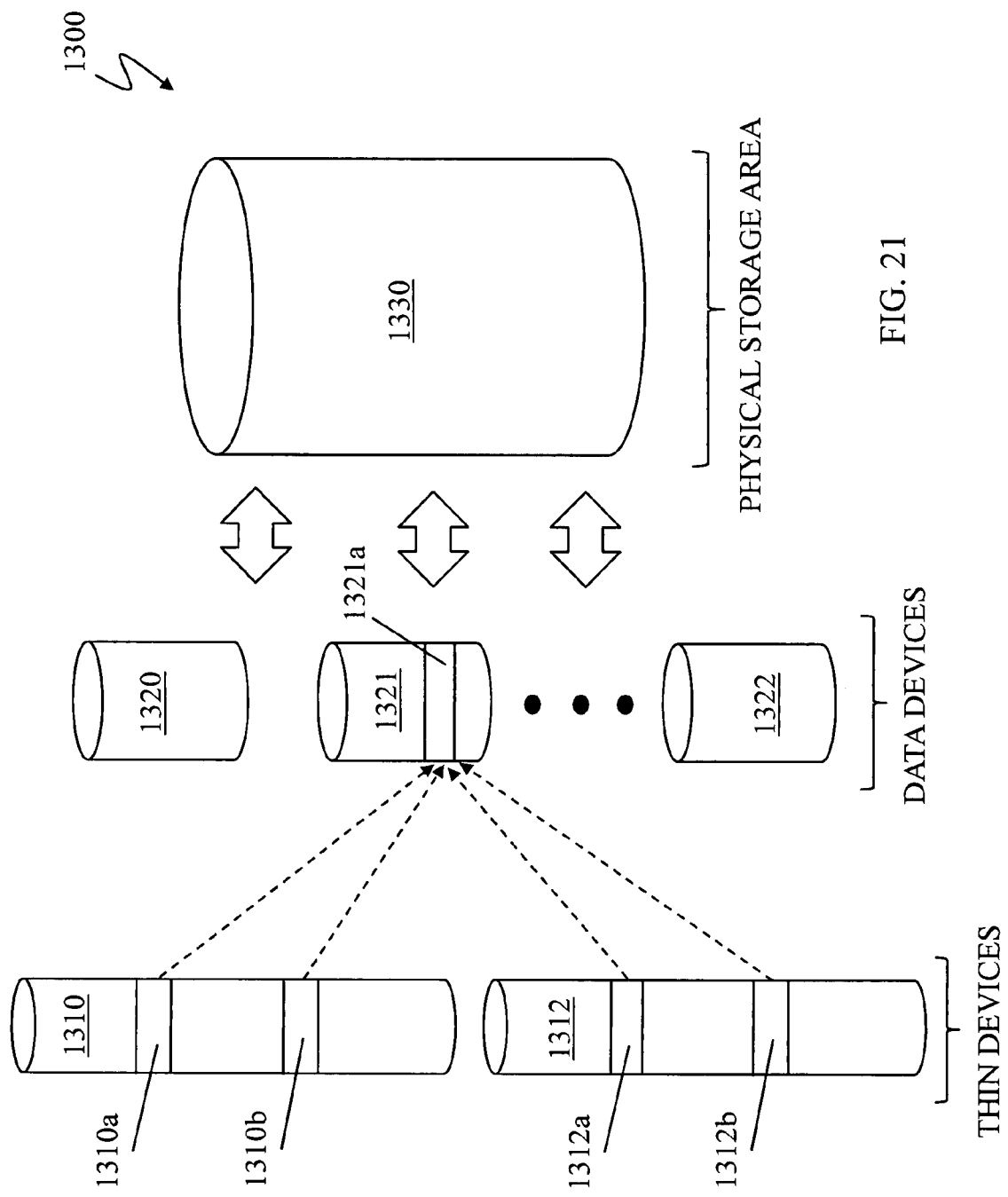
FIG. 21 is a schematic illustration of a storage device including multiple thin devices that provide cloning capability according to an embodiment of the system described herein.

FIG. 21 is a schematic illustration of a storage device 1300 including multiple thin devices 1310, 1312 that provide cloning capability according to an embodiment of the system described herein. Cloning, as described herein, allows for more than one thin device to point to a data device chunk as way of providing an efficient cloning mechanism, and may be referred to as "sparse cloning". In this way, cloning operations may be almost instantaneous, involving just the setting of pointers, and initially consume little or no additional physical storage space. If the clone is written to, the HA may perform the intercept operation, as discussed elsewhere wherein. A reference counting mechanism, as further discussed elsewhere herein, may be used to indicate that a data chunk is used by more than one thin device. As illustrated, thin chunks 1310*a*, 1310*b* of the thin device 1310 are subject to de-duplication processing and each point to a common data chunk 1321*a* of a data device 1321 that is mapped to a physical storage area 1330 (e.g., one or more physical drives), as further discussed elsewhere herein. Another thin device 1312, a clone, may be provided having thin chunks 1312*a*, 1312*b* that also point to the data chunk 1321*a*. Accordingly, the thin device 1310 is a clone of the thin device 1312 using only manipulation of pointers and without the use of additional physical storage space. As shown, the thin devices 1310, 1312 include multiple pointers to de-duplicated data for each thin device; however, in other embodiments, cloning using the thin devices 1310, 1312 may also be provided separately from multiple instances of de-duplicated data. For example, the cloning of the thin device 1310 using the cloned thin device 1312 may represent the only de-duplication of the data stored on the data devices 1320-1322. Clones may also be used with RDF devices, as further discussed elsewhere herein.

Figure 22A:
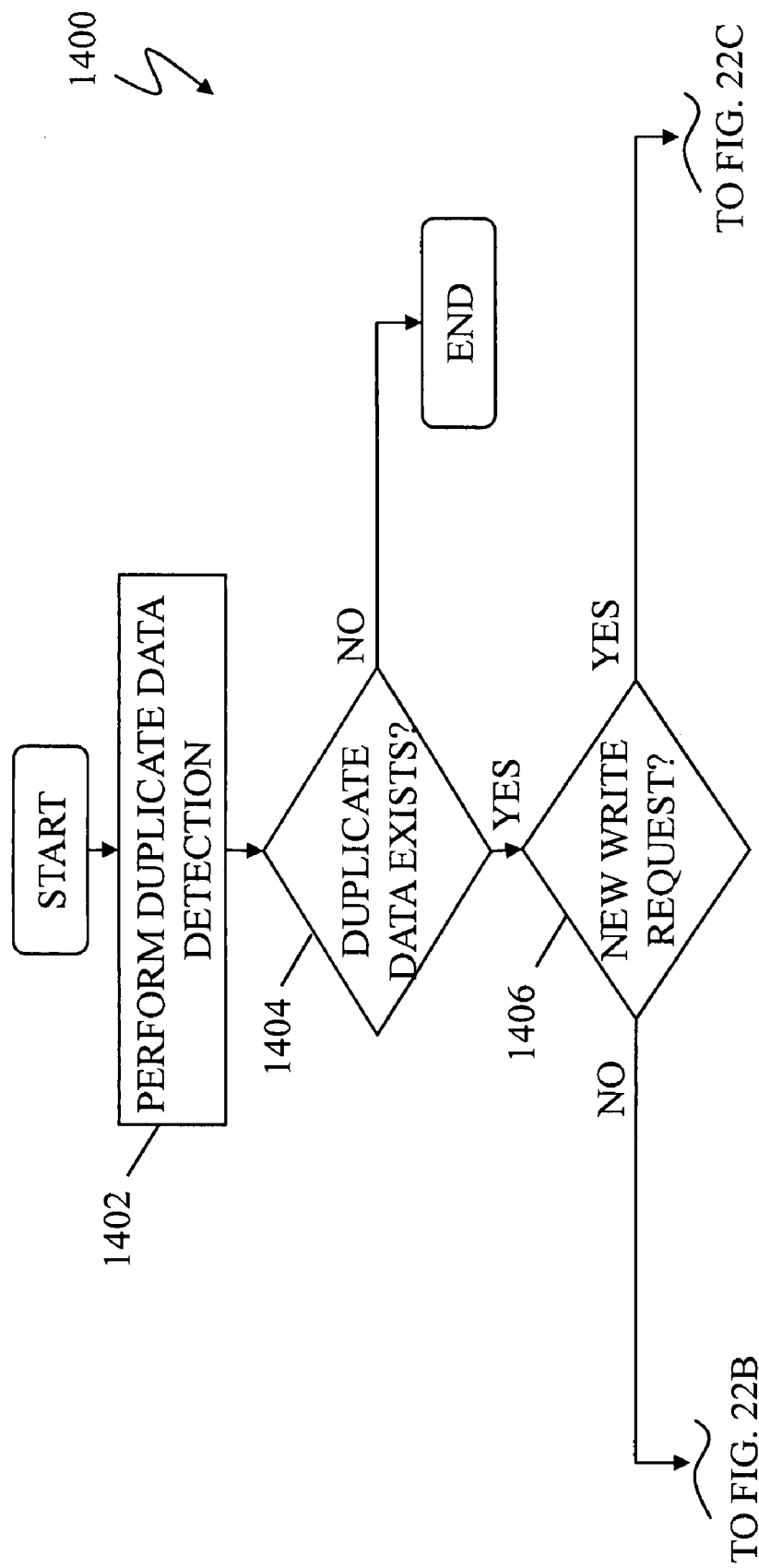
FIG. 22A is a flow diagram showing de-duplication processing according to an embodiment of the system described herein.

FIG. 22A is a flow diagram 1400 showing de-duplication processing according to an embodiment of the system described herein. At a step 1402, duplicate data detection processes are performed using detection techniques discussed elsewhere herein. Duplicate data detection may be performed in conjunction with data of a new write request and/or periodically of existing data as a background process. After the step 1402, processing proceeds to test step 1404 where it is determined if an instance of duplicate data exists. If not, then processing is complete. If duplicate data does exist then, then processing proceeds to a test step 1406 where it is determined whether the duplicate data has been detected in conjunction with a new write request of data. If at the test step 1406, it is determined that the duplicate data is not detected in conjunction with a new write request, and instead is a detection of existing instances of duplicate data (i.e. detected by a background process), then processing proceeds to the steps shown and described in conjunction with a flow diagram 1450 (discussed below). Otherwise, if it is determined that the detection of duplicate data does involve the data of a new write request, then processing proceeds to the steps shown and described in conjunction with a flow diagram 1460 (discussed below).

FIG. 22B illustrates the flow diagram 1450 showing de-duplication processing for detection of existing instances of duplicate data. At a step 1408, one of the sets of duplicate data is selected to be the operable data chunk. The selection may be based on characteristics of the data chunk on which a set of duplicate data is stored or the data device on which the data chunk is stored. One characteristic for determining selection may be the number of owners of data used by the data chunk. For example, for two duplicate data chunks, the data chunk having the most owners may be selected as the operable data chunk (and the data chunk with the fewer number of owners to be designated as free storage space) in order to reduce overhead costs associated with the de-duplication process by allowing for modification of a fewer number of pointers. Alternatively, in other embodiments, the duplicate data set that was most recently written may be selected and/or the data set that is stored on a data device associated with a particular storage tier, for example the fastest storage tier, may be selected. Other selection algorithms may be used.

After the step 1408, processing proceeds to a step 1410 where the first owner, i.e. the first thin chunk, pointing to the non-selected data chunk is identified. After the step 1410, processing proceeds to a step 1412 where a pointer from the identified thin chunk owner pointing to the non-selected data chunk is modified to instead point to the selected operable data chunk. After the step 1412, processing proceeds to a step 1414 where a reference counter for the selected data chunk is incremented to reflect that an additional thin chunk is now pointing to the selected data chunk. After the step 1414, processing proceeds to a step 1416 where a reference counter for the non-selected data chunk is decremented to reflect that a thin chunk is no longer pointing to the non-selected data chunk. Alternatively, is should be noted that the order of steps 1414 and 1416 may be reversed. After the step 1416, processing proceeds to a test step 1418 where it is determined if the reference counter of the non-selected data chunk is zero. If the reference counter of the non-selected counter is not zero, indicating value of one or greater, then processing proceeds to a step 1420 where another owner of the data in the non-selected data chunk is identified. After the step 1420, processing proceeds back to the step 1412.

If after test step 1418, it is determined that the reference counter of the non-selected data chunk is zero, then processing proceeds to a step 1422 where the storage space of the non-selected data chunk is de-allocated and otherwise freed for subsequent use. After the step 1422, processing is complete.

Figure 22C:
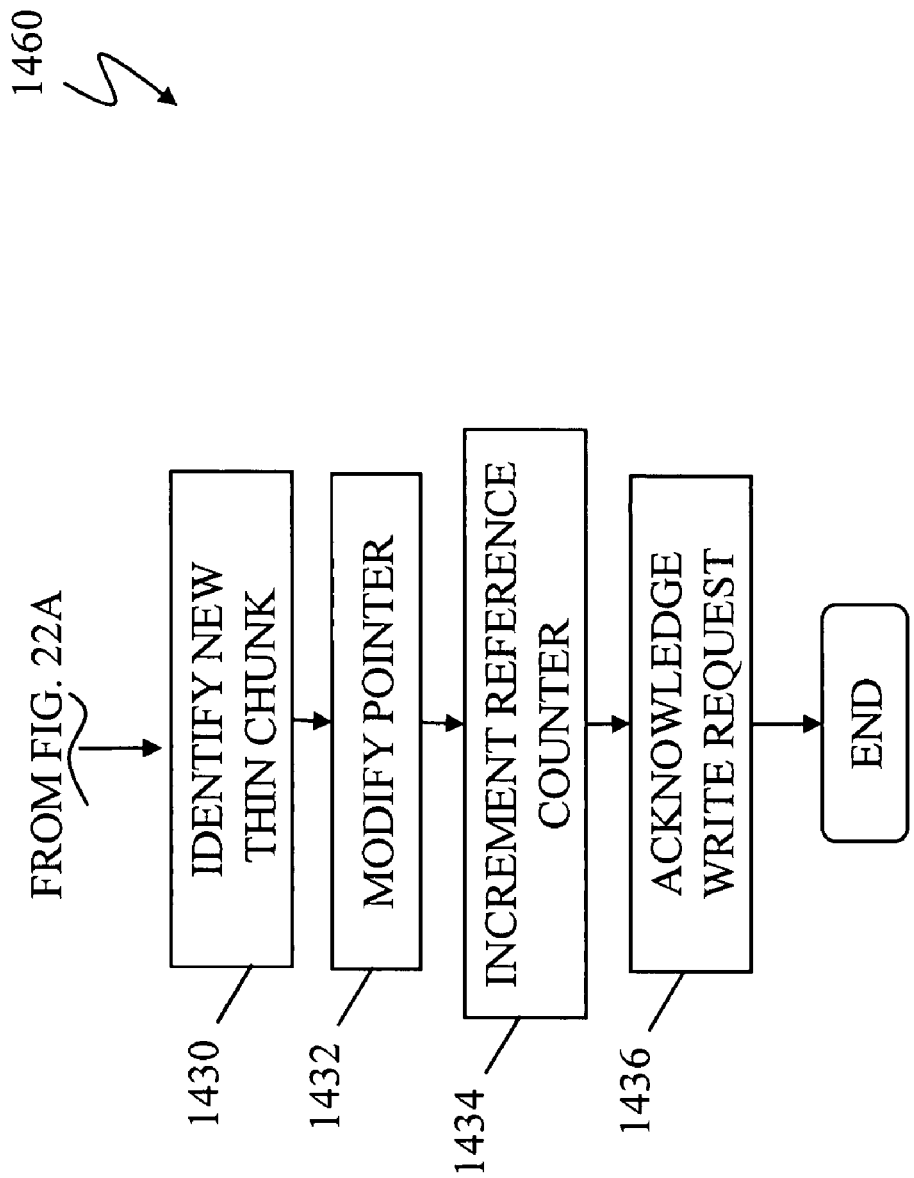
FIG. 22C illustrates the flow diagram showing de-duplication processing for detection of duplicate data that does involve the data of a new write request.

FIG. 22C illustrates the flow diagram 1460 showing de-duplication processing for detection of duplicate data that involves the data of a new write request. At a step 1430, a new thin chunk is identified on a thin device for the new write request. After the step 1430, processing proceeds to a step 1432 where the new thin chunk is modified to point directly or indirectly to the data chunk that contains the already-existing copy of the data of the new write. As further discussed elsewhere herein, this may include a pointer from the new thin chunk directly to the existing data chunk and/or may include a pointer of the new thin chunk to the existing thin chunk that already points to the existing data chunk. After the step 1432, processing proceeds to a step 1434 where the reference counter for the existing data chunk may be incremented to reflect that an additional owner, i.e. thin chunk, is now pointing to the already-existing data chunk. After the step 1434, processing proceeds to a step 1436 where the write request may be acknowledged, for example to the host. After step 1436, processing is complete.

Figure 23:
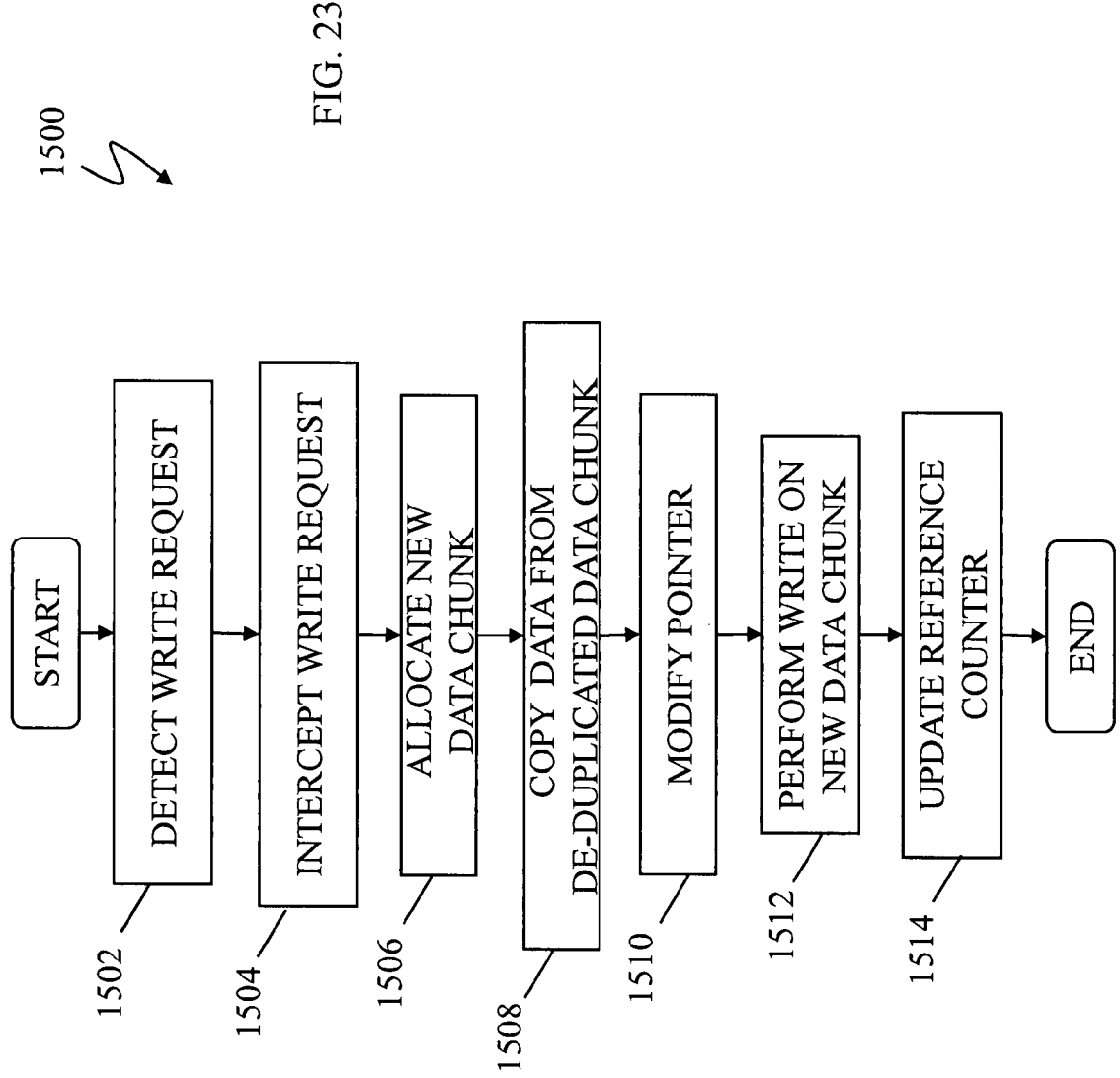
FIG. 23 is a flow diagram showing processing for intercepting, copying and merging data previously having undergone de-duplication processing but subject to changes so as to no longer be duplicate data, according to an embodiment of the system described herein.

FIG. 23 is a flow diagram 1500 showing processing for intercepting, copying and merging data previously having undergone de-duplication processing but subject to changes so as to no longer be duplicate data, according to an embodiment of the system described herein. At a step 1502, a write request is detected that concerns a de-duplicated data chunk having at least two owners. After the step 1502, processing proceeds to a step 1504 where the write request is intercepted by the system, for example by the HA. After the step 1504, processing proceeds to a step 1506 where a new data chunk is allocated on a data device, which may be the same or a different data device than the data device of the existing de-duplicated data chunk. After the step 1506, processing proceeds to a step 1508 wherein data of the existing de-duplicated data chunk is copied to the new data chunk. After the step 1508, processing proceeds to a step 1510 where the pointer of the thin chunk of the thin device to which the write request was made is modified to point to the new data chunk. After the step 1510, processing proceeds to a step 1512 where the write of the write request is performed to change the data on the new data chunk. After the step 1512, processing proceeds to a step 1514 where the reference counter of the previously de-duplicated data chunk is updated to decrement the counter by one, reflecting that there are now fewer owners of that data chunk. After the step 1514, processing is complete.

Figure 24:
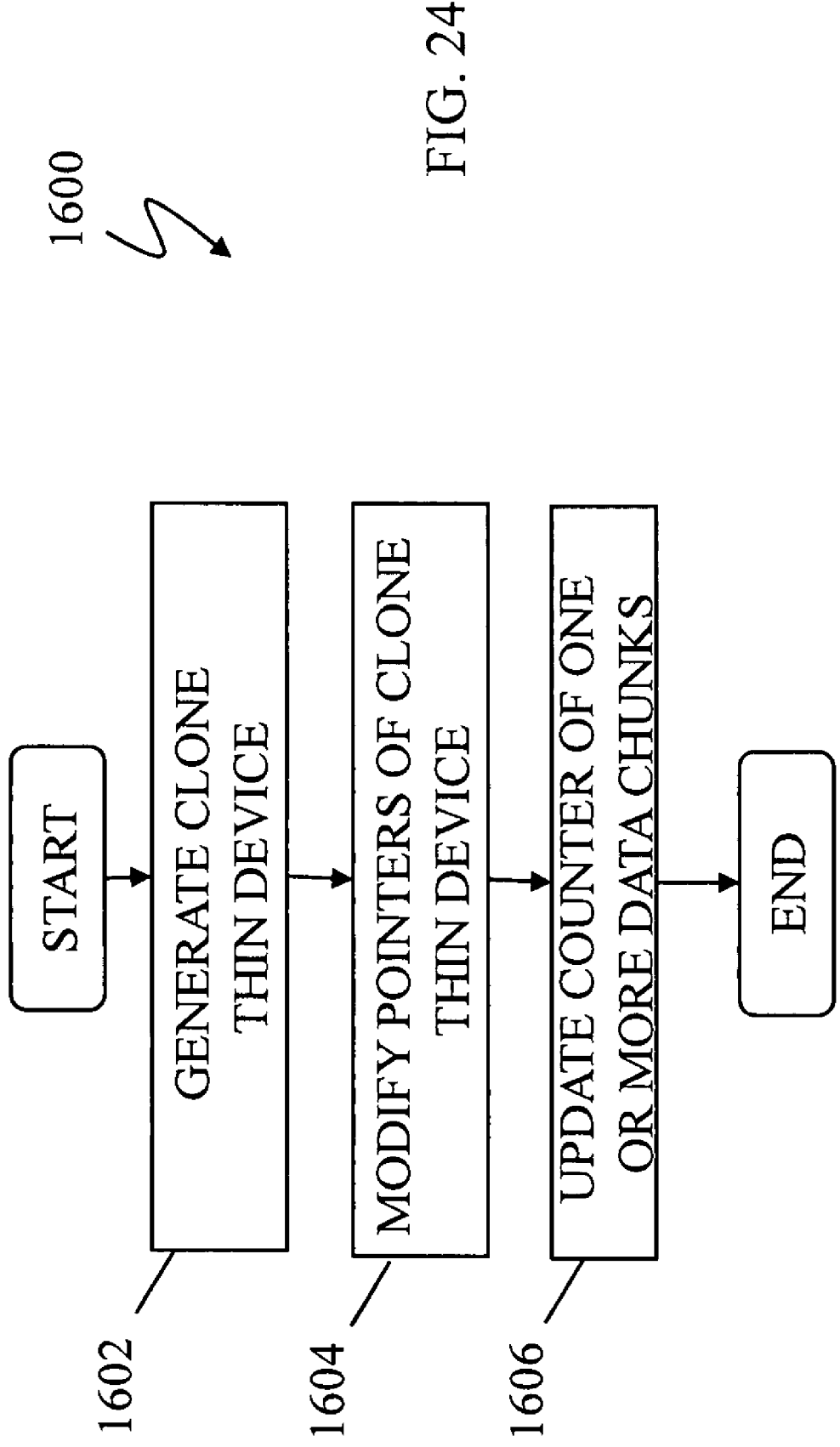
FIG. 24 is a flow diagram showing sparse cloning processing according to an embodiment of the system described herein.

FIG. 24 is a flow diagram 1600 showing cloning according to an embodiment of the system described herein. At a step 1602, a clone thin device is generated that is to be a clone of an original thin device. After the step 1602, processing proceeds to a step 1604 where pointers of the clone thin device are modified to point to the same one or more data chunks pointed to by the original thin device. After the step 1604, processing proceeds to a step 1606 where reference counters associated with the one or more data chunks are updated to reflect that more than one thin device points to the one or more data chunks. After the step 1606, processing is complete.

Figure 25:
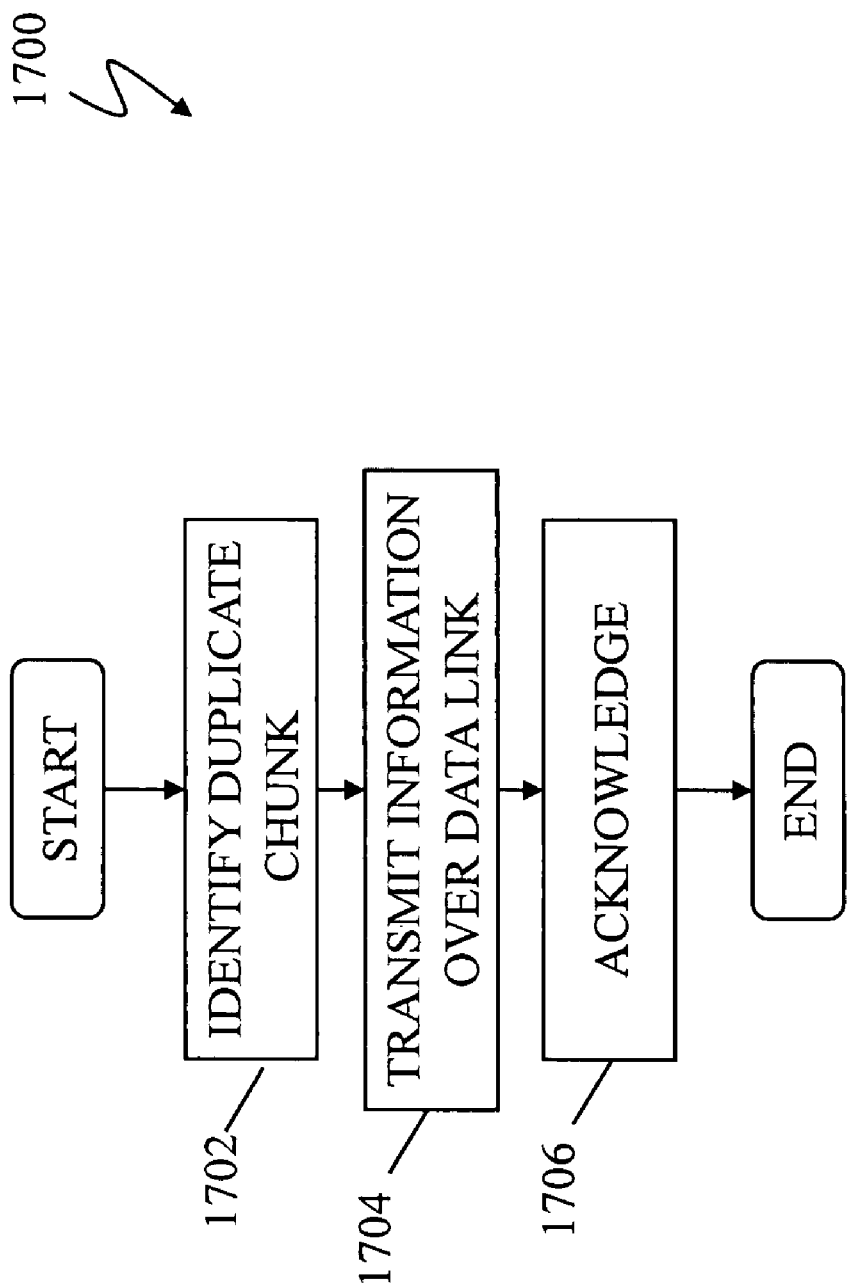
FIG. 25 is a flow diagram showing de-duplication processing at the local storage device for detection of duplicate data being transferred from a local storage device to a remote storage device.

FIG. 25 is a flow diagram 1700 showing de-duplication processing at the local storage device for detection of duplicate data being transferred from a local storage device to a remote storage device according to an embodiment of the system described herein. At a step 1702, a duplicate chunk is identified prior to being transferred to the remote storage device. After the step 1702, processing proceeds to a step 1704 where information is transmitted to the remote storage device over the data link to identify the duplicate chunk. In this way, unnecessary data is not transmitted over the data link. After the step 1704, processing proceeds to a step 1706 where the write request may be acknowledged, for example to the host. Note that the type of acknowledgement provided at the step 1706 depends on the type of data transfer being used (e.g., SRDF/S, SRDF/A, etc.). After the step 1706, processing is complete at the local storage device.

Figure 26:
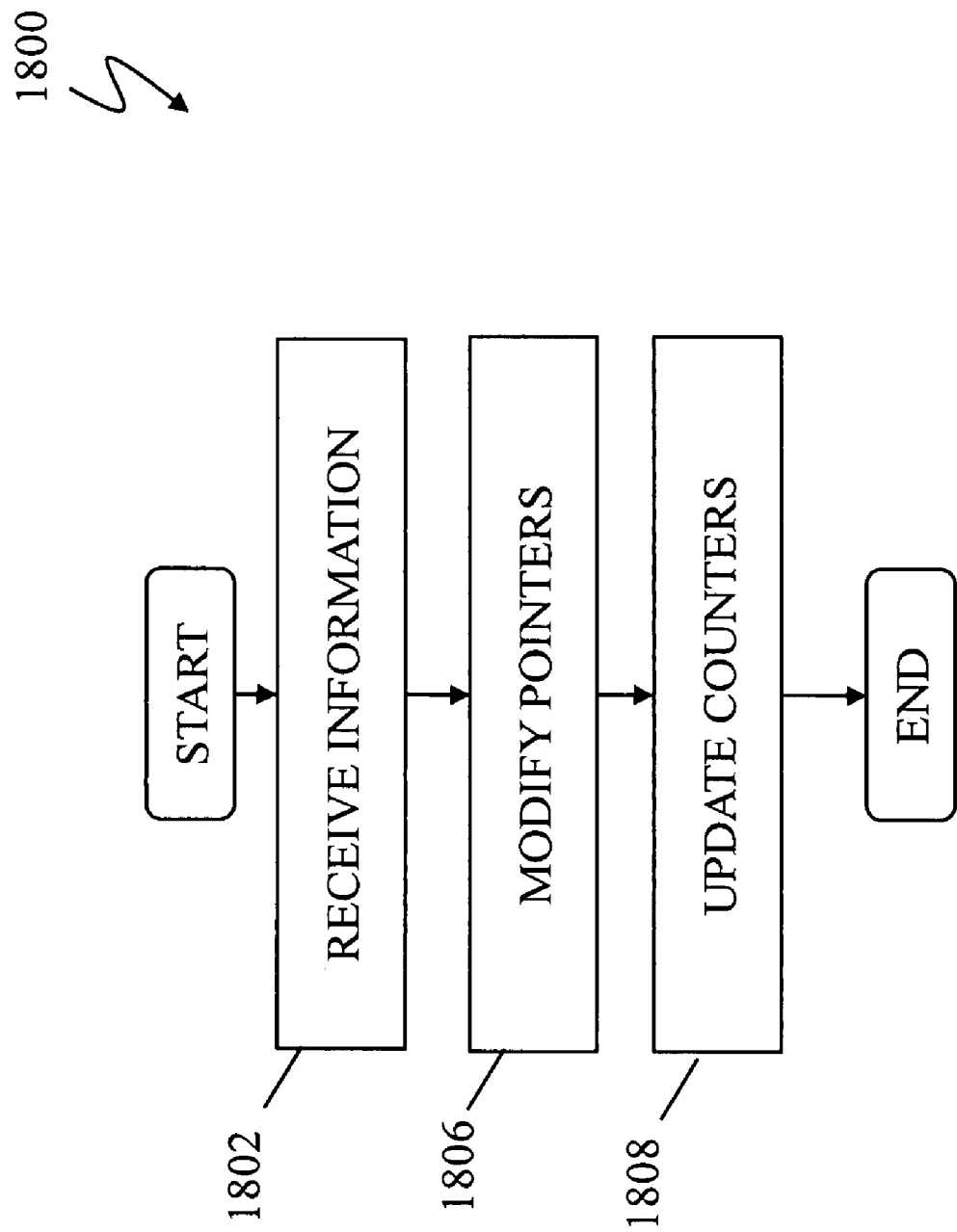
FIG. 26 is a flow diagram showing de-duplication processing at the remote storage device in response to information received over the data link from the local storage device.

FIG. 26 is a flow diagram 1800 showing de-duplication processing at the remote storage device in response to information received over the data link from the local storage device. At a step 1802, the remote storage device receives the information transmitted over the data link from the local storage device. After the step 1802, processing proceeds to a step 1806 where the remote storage device modifies the necessary pointers from the thin chunk owners to point to the applicable data chunk, like that described with respect to the local storage device. After the step 1806, processing proceeds to a step 1808 where the remote storage device updates the necessary reference counter of the applicable data chunk. After the step 1808, processing is complete.

It should also be noted that de-duplication processing like that described with respect to the local storage device may also be conducted independently at the remote storage device. For example, the de-duplication may be performed as part of background processing procedures at the remote storage device. Note also that the system described herein does not depend on any particular physical distance between devices (e.g., between a thin device and any corresponding data devices and/or between a data device and any corresponding physical storage area) so that, in appropriate instances, the devices may be physically separated into different geographic areas (e.g., U.S. east coast and U.S. west coast).

The above-noted steps, and other steps described herein, may be performed automatically by the system described herein. For example, steps described herein may be performed periodically, at designated times, and/or after particular trigger events, such as receipt of a write request, access by a particular user to the system (log in and/or log out), after assessment of space usage on the disk drives (for example, space usage on the fast disk drive) and/or after some other suitable I/O action. Alternatively, the steps described herein may be activated manually by a user and/or a system administrator. In an embodiment, the system described herein may include a system having at least one processor that performs any of the above-noted steps. Further, computer software, stored in a computer-readable medium, may be provided according to the system described herein including executable code for carrying out any of the steps and processes described herein.

The system described herein provides an architecture for dynamically deploying, applying, managing and/or optimizing tiers of block storage is provided in a manner that is transparent and non-intrusive to standard host operating systems, file systems, databases and/or other data repositories. The system provides for data management using thin provisioning techniques to manage and relocate data among multiple storage tiers, offering at least the following advantages: (a) does not require special host-resident file system replacement or extension software, (b) may operate at a granularity smaller than the file level, (c) may transparently support any host application that utilizes the data block device (file system, databases, etc.) and (d) may allow for the dynamic relocation of data blocks, including portions of files, datasets and/or databases, based on application demand and/or policy. The system further provides for de-duplication of data to eliminate instances of redundant data and reduce the unnecessary use of storage space and for sparsely cloning of data to facilitate data management.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method of de-duplicating data, comprising:
   providing a first volume including at least one pointer to a second volume that corresponds to physical storage space, wherein the first volume is a logical volume;
   detecting a first set of data as a duplicate of a second set of data stored on the second volume at a first data chunk; and
   modifying a pointer of the first volume associated with the first set of data to point to the first data chunk, wherein, after modifying the pointer, no additional physical storage space is allocated for the first set of data, wherein the first volume includes a first chunk and a second chunk, and wherein the first chunk of the first volume includes the pointer to the first data chunk of the second volume, and wherein the second chunk of the first volume includes a pointer that points to the first chunk of the first volume.

2. The method according to claim 1, further comprising:
   updating a counter associated with the first data chunk that identifies a number of pointers pointing to the first data chunk.

3. The method according to claim 1, wherein the second volume is at least one of: a physical storage area that contains the physical storage space and a logical volume that maps to allocations of the physical storage space.

4. The method according to claim 1, wherein the first set of data previously exists on the second volume, and wherein the method further includes:
   de-allocating physical storage space associated with the first set of data that previously existed on the second volume.

5. The method according to claim 1, wherein the first set of data is associated with a new write request, and wherein the method further includes:
   intercepting the new write request after detecting that the first set of data of the new write request is a duplicate of the second set of data stored on the second volume.

6. The method according to claim 1, wherein the first volume includes a thin device.

7. The method according to claim 1, wherein the first chunk of the first volume includes a first thin chunk and the second chunk of the first volume includes a second thin chunk.

8. The method according to claim 1, further comprising:
   intercepting a write request to change data associated with a particular one of the first set of data and the second set of data;
   copying the particular one of the first set of data and the second set of data to a different data chunk;
   modifying a pointer of a volume associated with the particular one of the first set of data and the second set of data to point to the different data chunk;
   decrementing a counter associated with a first data chunk of the particular one of the first set of data and the second set of data; and
   performing the write request to change the particular one of the first set of data and the second set of data at the different data chunk.

9. A computer program product, stored on a computer-readable medium, for de-duplicating data, comprising:
   executable code that provides a first volume including at least one pointer to a second volume that corresponds to physical storage space, wherein the first volume is a logical volume;
   executable code that detects a first set of data as a duplicate of a second set of data stored on the second volume at a first data chunk; and
   executable code that modifies a pointer of the first volume associated with the first set of data to point to the first data chunk, wherein, after modifying the pointer, no additional physical storage space is allocated for the first set of data, wherein the first volume includes a first chunk and a second chunk, and wherein the first chunk of the first volume includes the pointer to the first data chunk of the second volume, and wherein the second chunk of the first volume includes a pointer that points to the first chunk of the first volume.

10. The computer program product according to claim 9, further comprising:
    executable code that updates a counter associated with the first data chunk that identifies a number of pointers pointing to the first data chunk.

11. The computer program product according to claim 9, wherein the second volume is at least one of: a physical storage area that contains the physical storage space and a logical volume that maps to allocations of the physical storage space.

12. The computer program product according to claim 9, wherein the first set of data previously exists on the second volume, and wherein the computer program product further includes:
    executable code that de-allocates physical storage space associated with the first set of data that previously existed on the second volume.

13. The computer program product according to claim 9, wherein the first set of data is associated with a new write request, and wherein the computer program product further includes:
    executable code that intercepts the new write request after detecting that the first set of data of the new write request is a duplicate of the second set of data stored on the second volume.

14. A computer storage device, comprising:
    a plurality of interconnected directors, wherein at least some of the directors handle reading and writing data for the computer storage device;
    a plurality of disk drives, coupled to at least some of the directors, that store data for the computer storage device; and
    computer software, provided on a computer readable medium of at least one of the directors, having executable code that provides a first volume including at least one pointer to a second logical volume that maps allocations of physical storage space, wherein the first volume is a logical volume, executable code that detects a first set of data as a duplicate of a second set of data stored on the second volume at a first data chunk, and executable code that modifies a pointer of the first volume associated with the first set of data to point to the first data chunk, wherein, after modifying the pointer, no additional physical storage space is allocated for the first set of data, wherein the first volume includes a first chunk and a second chunk, and wherein the first chunk of the first volume includes the pointer to the first data chunk of the second logical volume, and wherein the second chunk of the first volume includes a pointer that points to the first chunk of the first volume.

15. The computer storage device according to claim 14, wherein the computer software further includes:
    executable code that updates a counter associated with the first data chunk that identifies a number of pointers pointing to the first data chunk.

16. The computer storage device according to claim 14, wherein the second volume is at least one of: a physical storage area that contains the physical storage space and a logical volume that maps to allocations of the physical storage space.

17. The computer storage device according to claim 14, wherein the first set of data previously exists on the second volume, and wherein the computer software further includes:
executable code that de-allocates physical storage space associated with the first set of data that previously existed on the second volume.

18. The computer storage device according to claim 14, wherein the first set of data is associated with a new write request, and wherein the computer software further includes:
executable code that intercepts the new write request after detecting that the first set of data of the new write request is a duplicate of the second set of data stored on the second volume.

19. A computer storage system, comprising:
a remote storage device; and
a local storage device coupled to the remote storage device via a data link, the local storage device having at least one processor that controls a first logical volume of the local storage device, the first logical volume including at least one pointer to a second volume of the local storage device that corresponds to physical storage space, wherein in response to the local storage device detecting duplicate data prior to transmission of data to the remote storage device, the local storage device transmits information indicative of the duplicate data instead of the data, wherein the first logical volume includes a first chunk and a second chunk, and wherein the first chunk of the first logical volume includes the at least one pointer to the second volume, and wherein the second chunk of the first logical volume includes a pointer that points to the first chunk of the first logical volume.

20. The computer storage system according to claim 19, wherein the second volume is at least one of: a physical storage area that contains the physical storage space and a logical volume that maps to allocations of the physical storage space.

21. The computer storage system according to claim 19, wherein a first set of data is associated with a new write request, and wherein the at least one processor intercepts the new write request after detecting that the first set of data of the new write request is a duplicate of a second set of data stored on the second volume.

22. The computer storage system according to claim 19, wherein the remote storage device updates a counter associated with data that identifies a number of pointers pointing to a data chunk of the second volume.

23. The computer storage system according to claim 19, wherein, following transmitting the information indicative of duplicate data, the local storage device provides an acknowledgement.

24. A method of cloning data, comprising:
providing a first volume including at least one pointer to a second volume that corresponds to physical storage space, wherein the at least one pointer of the first volume points to a data chunk stored on the second volume, and wherein the first volume is a logical volume, wherein the first volume includes a first chunk and a second chunk, and wherein the first chunk of the first volume includes the at least one pointer to the data chunk stored on the second volume, and wherein the second chunk of the first volume includes a pointer that points to the first chunk of the first volume;
providing a third volume including at least one pointer, wherein the third volume is another logical volume; and
modifying the at least one pointer of the third volume to point to the data chunk without allocating any additional physical storage space.

25. The method according to claim 24, further comprising:
updating a counter associated with the data chunk to indicate that more than one logical volume points to the data chunk.

* * * * *